United States Patent
Glover et al.

(10) Patent No.: US 10,936,584 B2
(45) Date of Patent: Mar. 2, 2021

(54) SEARCHING AND ACCESSING APPLICATION-INDEPENDENT FUNCTIONALITY

(71) Applicant: Samsung Electronics Co., Ltd., Suwon-si (KR)

(72) Inventors: Eric J. Glover, Palo Alto, CA (US); Jason Hreha, Dunville, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 681 days.

(21) Appl. No.: 14/972,988

(22) Filed: Dec. 17, 2015

(65) Prior Publication Data

US 2016/0179882 A1    Jun. 23, 2016

Related U.S. Application Data

(60) Provisional application No. 62/094,350, filed on Dec. 19, 2014.

(51) Int. Cl.
G06F 16/2452    (2019.01)

(52) U.S. Cl.
CPC .... G06F 16/2452 (2019.01); G06F 16/24524 (2019.01)

(58) Field of Classification Search
CPC ......... G06F 17/30427; G06F 16/24524; G06F 16/2452
See application file for complete search history.

(56) References Cited

U.S. PATENT DOCUMENTS

| | | | | |
|---|---|---|---|---|
| 6,505,200 B1* | 1/2003 | Ims | ............ | G06F 16/1794 707/638 |
| 2009/0089671 A1* | 4/2009 | Bliss | ............ | G06F 8/30 715/700 |
| 2010/0082523 A1* | 4/2010 | Lim | ............ | G06F 9/44505 706/60 |
| 2013/0111499 A1* | 5/2013 | Dixon | ............ | G06F 13/00 719/314 |
| 2014/0108809 A1* | 4/2014 | Marshall | ............ | G06F 21/00 713/176 |
| 2014/0163959 A1* | 6/2014 | Hebert | ............ | G06F 17/2785 704/9 |
| 2017/0083527 A1* | 3/2017 | Kumar | ............ | G06F 17/30899 |

* cited by examiner

*Primary Examiner* — Taelor Kim
(74) *Attorney, Agent, or Firm* — Jefferson IP Law, LLP

(57) ABSTRACT

A method includes receiving a translation request including an application-independent function name and one or more parameters from a user device. The method further includes retrieving a translation record, the translation record including the application-independent function name of the translation request, one or more access mechanism templates, and template rules for generating a completed access mechanism based on the access mechanism templates. Additionally, the method includes generating one or more completed access mechanism based on the one or more parameter values, the access mechanism templates, and the template rules, generating translation results based on the completed access mechanisms, and transmitting the translation results to the user device. The translation results are configured to be displayed as user-selectable links.

21 Claims, 21 Drawing Sheets

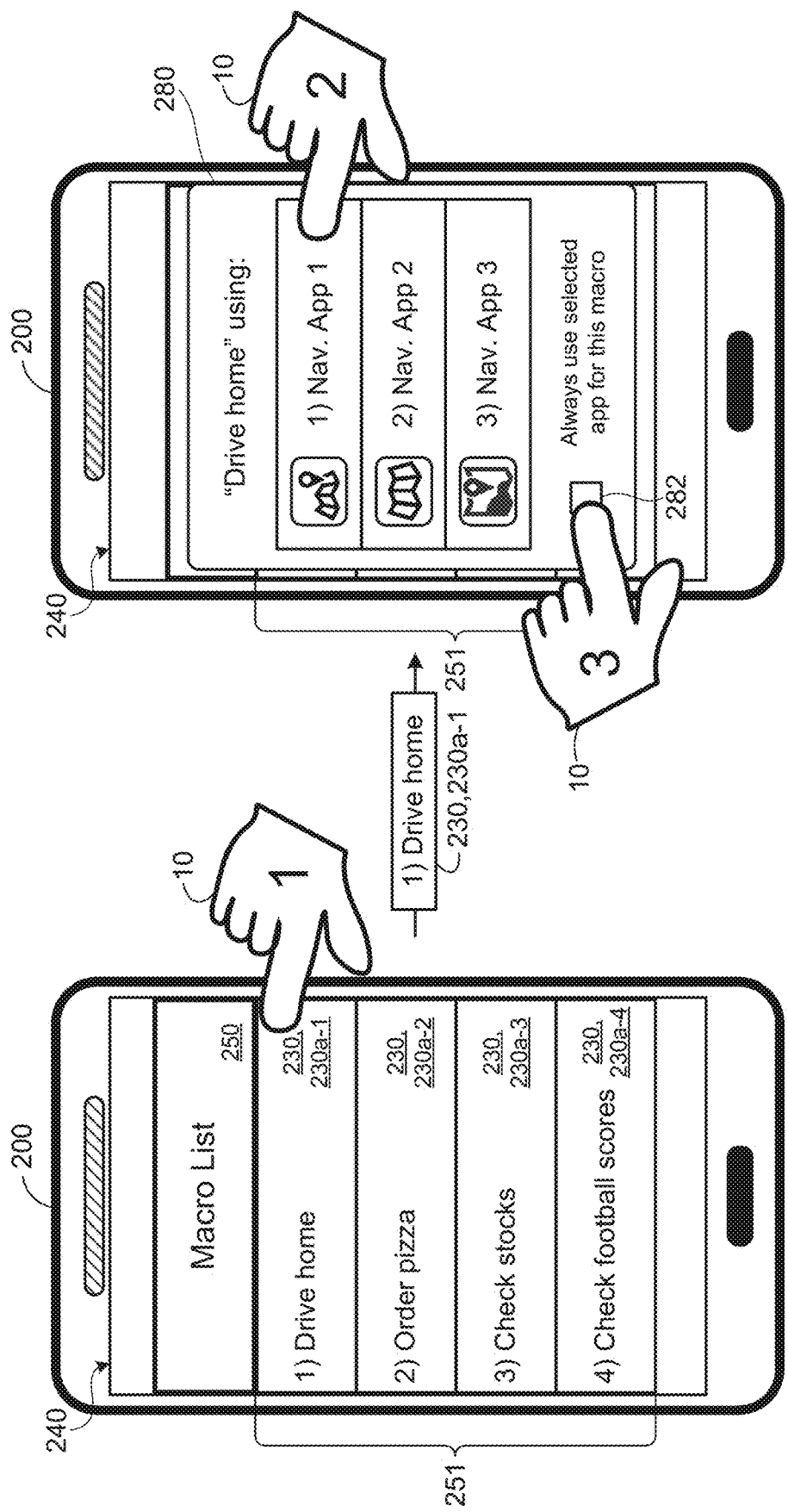

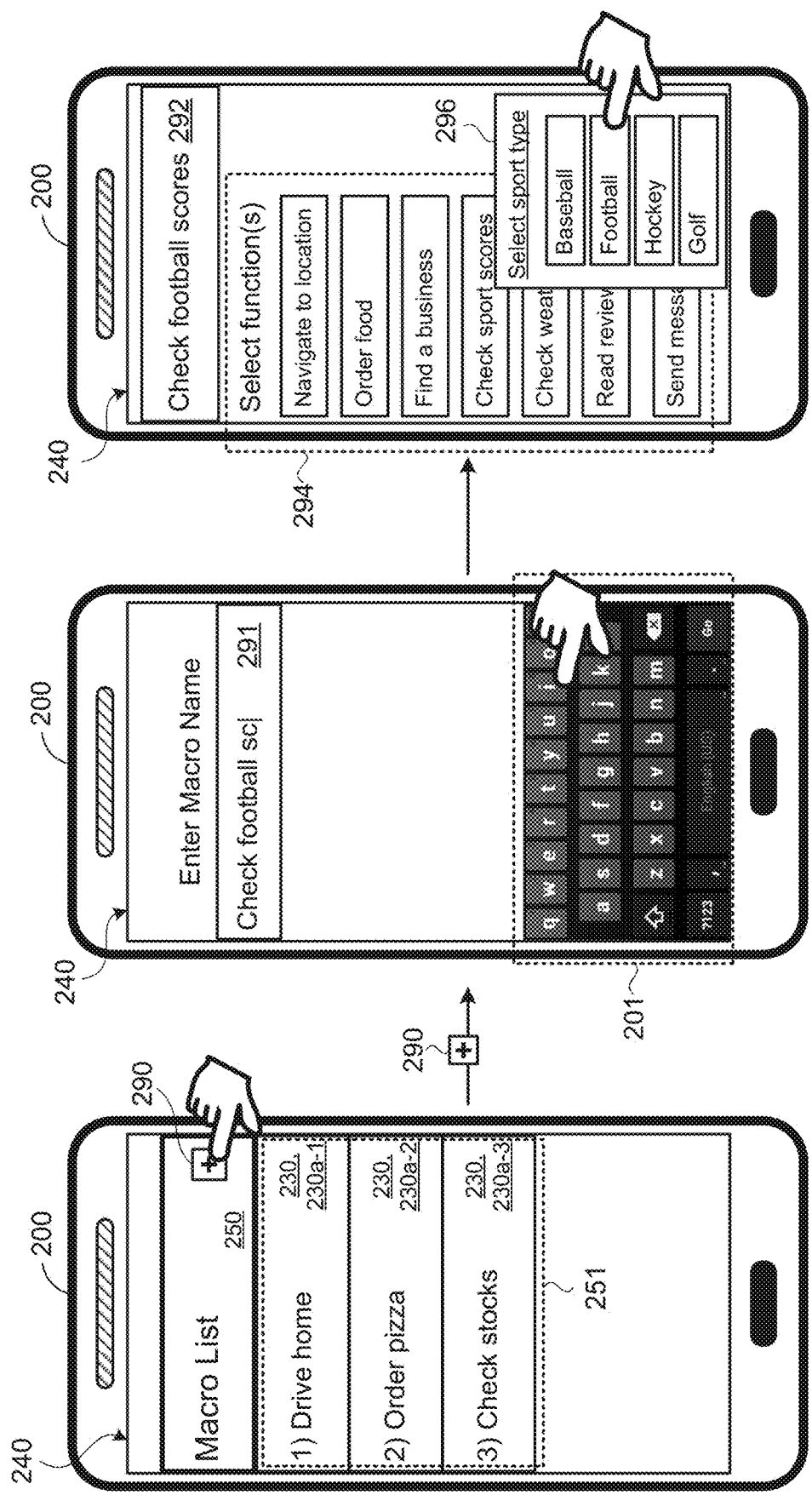

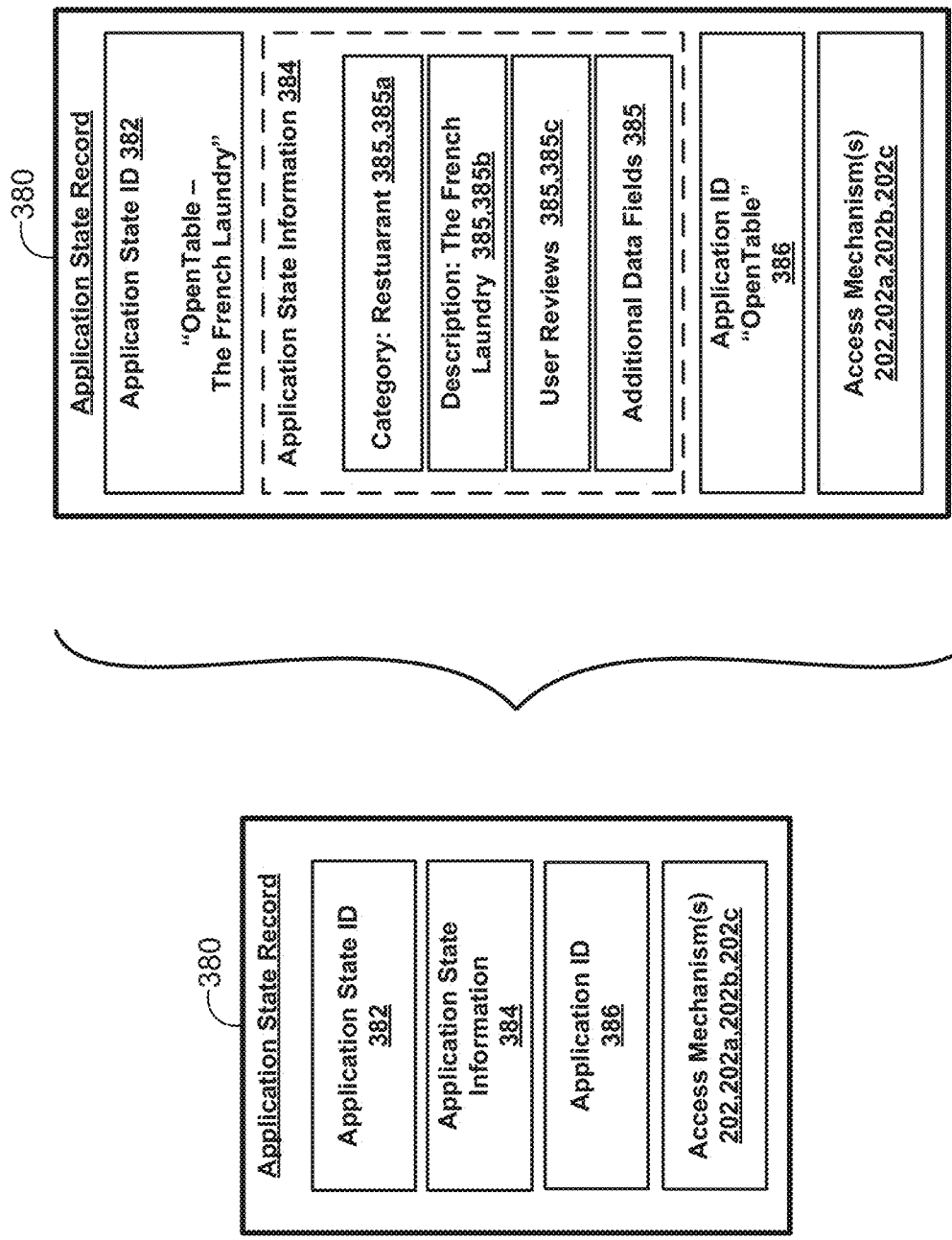

SEARCHING AND ACCESSING APPLICATION-INDEPENDENT FUNCTIONALITY

CROSS REFERENCE TO RELATED APPLICATIONS

This U.S. patent application claims priority under 35 U.S.C. § 119(e) to U.S. Provisional Application 62/094,350, filed on Dec. 19, 2014, which is hereby incorporated by reference in its entirety.

TECHNICAL FIELD

This disclosure relates to searching, accessing, and displaying functionality of applications.

BACKGROUND

In recent years, use of computers, smartphones, and other Internet-connected devices has grown exponentially. Correspondingly, the number of available software applications for such devices has also grown. Today, many diverse native and web software applications can be accessed on any number of different devices, including, but not limited to, smartphones, personal computers, automobiles, and televisions. These diverse applications can range from business driven applications to games, educational applications, news applications, shopping applications, messaging applications, media streaming applications, social networking applications, and so much more. Furthermore, application developers develop vast amounts of applications within each genre and each application may have numerous editions. As a result, users of these Internet-connected devices have encountered the problem of finding the correct native or web software application offering the information and/or functionality that they seek. In response to this problem, techniques have arisen to connect users of these devices to relevant application and web content.

SUMMARY

In one example, the present disclosure is directed to a method comprising receiving, at a processing system of one or more processors, a translation request including an application-independent function name and one or more parameter values from a user device. The method further comprises retrieving a translation record from a plurality of translation records using the translation request, the translation record comprising translation information matching to the translation request. The translation record includes one or more access mechanism templates and template rules for generating a completed access mechanism based on the access mechanism templates. The method further comprises generating one or more completed access mechanisms based on the one or more parameter values, the access mechanism templates, and the template rules. Additionally, the method further comprises generating translation results based on the completed access mechanisms and transmitting the translation results to the user device. The translation results are configured to be displayed as user-selectable links.

In another example, the present disclosure is directed to a system comprising one or more computing devices and a data store. The data store comprises one or more storage devices. The one or more computing devices include one or more processing units that execute computer-readable instructions, the computer-readable instructions, when executed by the one or more processing units, cause the one or more computing devices to receive a translation request including an application-independent function name and one or more parameter values from a user device. The one or more computing devices are further configured to retrieve a translation record from a plurality of translation records using the translation request, the translation record comprising translation information matching to the translation request. The translation record includes one or more access mechanism templates and template rules for generating a completed access mechanism based on the access mechanism templates. The one or more computing devices are further configured to generate one or more completed access mechanisms based on the one or more parameter values, the access mechanism templates, and the template rules. Additionally, the one or more computing devices are further configured to generate translation results based on the completed access mechanisms and transmit the translation results to the user device. The translation results are configured to be displayed as user-selectable links.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 4A is a schematic view of an example user selection of an application-independent function/macroinstruction.

FIG. 4B is a schematic view of an example user selection of an application-specific function based on the application-independent function selection of FIG. 4A.

FIGS. 5A–5C are schematic views of an example user device allowing the user to create a macroinstruction associated with an application-independent function.

FIGS. 7C and 7D are schematic view of example application state records.

Like reference symbols in the various drawings indicate like elements.

DETAILED DESCRIPTION

Figure 1A:
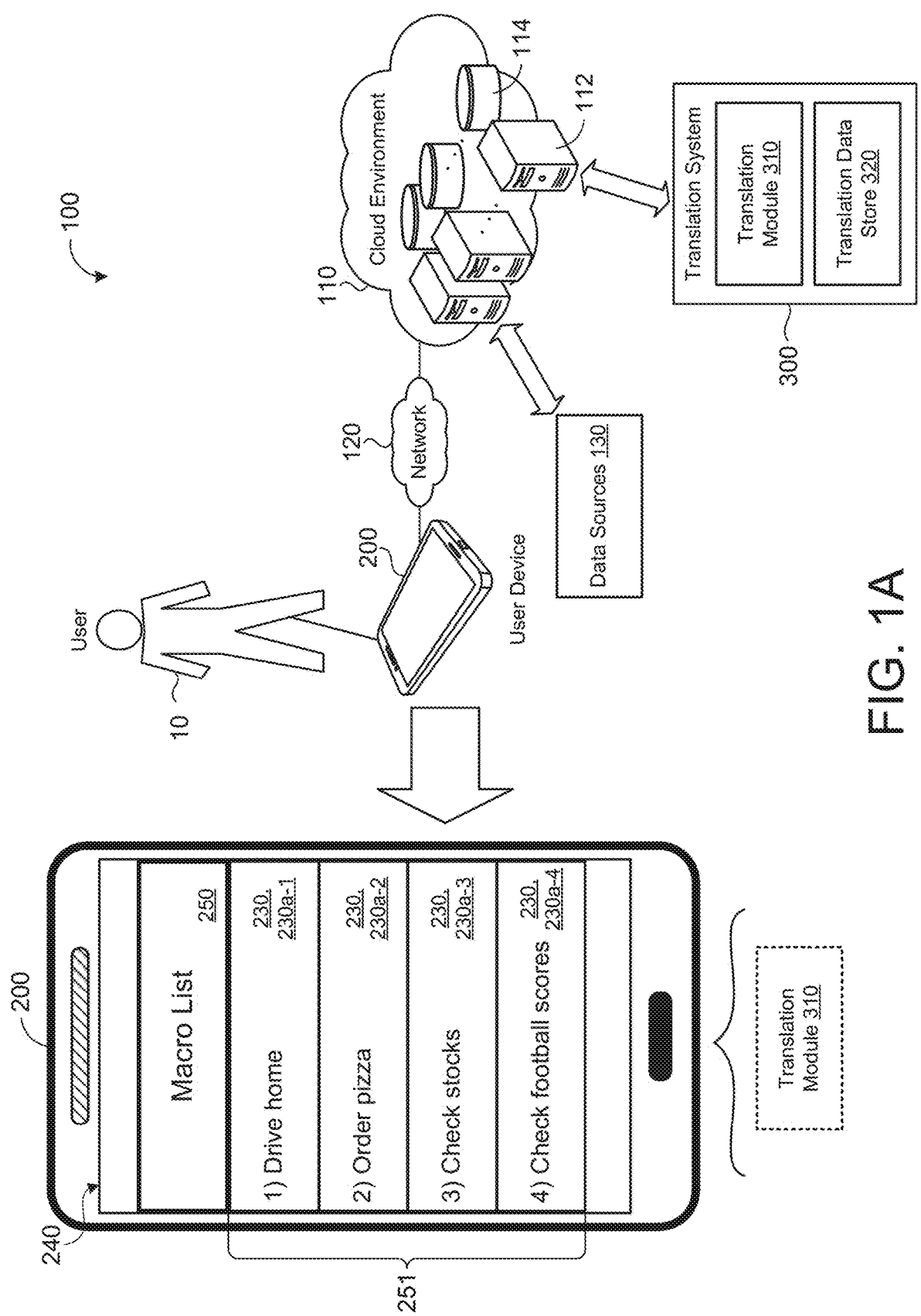
FIG. 1A is a schematic view of an example environment including a user device in communication with a translation system.

The present disclosure is directed to systems and methods that translate application-independent functions into one or more application-specific functions using a user device and/or a server device. Application-independent functions may be functions that do not require a specific application in order to be performed and can be performed by one or more applications. Application-specific functions refer to operations that a specific application may use to implement an application-independent function.

The translation system of the present disclosure can receive a translation request indicating an application-independent function and corresponding parameter values from a user device, translate the application-independent function into one or more application-specific functions using one or more access mechanism templates, template rules, and the received parameter values, and generate a set of user-selectable links associated with the one or more application-specific functions. The translation system may transmit the set of user-selectable links to the user device for rendering and display. In some implementations, the translation system may additionally rank the user-selectable links in a manner corresponding to the popularity of their underlying applications, the relevance of the application states underlying the user-selectable links, or any other suitable criteria related to the user-selectable links. For example, the translation system may rank applications associated with an application-independent function based on the likelihood that their application-specific functionality will adequately perform the application-independent function. In some implementations, the translation system may additionally or alternatively rank application states that perform an application-independent function in a manner that indicates the relative relevance, popularity, or any other suitable criteria associated with the application state. In some implementations, the translation system may be executed on the user device itself. In other implementations, the translation system may be executed on a remote server in communication with the user device. In still other implementations, the translation system may be partially executed on the user device and partially executed by a remote server in communication with the user device.

In some implementations, the user device and/or the translation system allow the user to define macroinstructions (hereafter referred to as "macros") that allow a user of the user device to access application-independent functionality according to pre-defined parameter values. In these implementations, the macroinstructions can be stored by the user device or by the translation system in a manner that allows a user of the user device to access the macroinstructions in the future. A user of the user device can assign values to the parameters of a particular application-independent function such that a user-generated macro can perform the particular application-independent function according to the pre-defined parameter values. Once the user has selected values for the parameters of an application-independent function, the translation system can identify applications (e.g., an application state) capable of performing the application-independent function. In some examples, the user may opt to choose a "default" application to perform the macro in the future. In other examples, the user may opt to allow the translation system to identify applications each time the macro is used, thereby allowing the user to access the application-independent functionality with a different application each time the macro is used. In some embodiments, the translation system may only identify applications already installed on the user device. Additionally or alternatively, the translation system may identify applications that have not been installed on the user device and provide a user of the user device with suggestions or recommendations to applications that can perform the application-independent function.

In some implementations, the translation system may be accessed by or in communication with a search system configured to receive a search query from a user device, identify applications corresponding to the search query, and transmit a set of identified applications to the user device (i.e., search results). In these implementations, the search system can leverage the translation system to serve application-independent functions in the form of user-selectable links to states of applications. For example, the search system may transmit the search query to the translation system which can analyze the search query to determine whether it specifies (either implicitly or explicitly) an application-independent function. For example, if a user enters a search query containing the words "cheap hotels in Portland tomorrow," the translation system may determine that several application-independent functions may be related and useful to the user making the query, such as the function "book a hotel room." In this example, the search system may include application-independent functions identified by the translation system as user-selectable links alongside the search results generated by the search system. In these examples, the translation system can identify parameter values for the application-independent functions based on information available in the search query and/or with information about the user transmitted from the search system and/or user device. Additionally or alternatively, the user device may prompt the user to enter parameter values for any remaining or missing parameters that the translation system is unable to determine from the search query or user data.

Figure 1B:
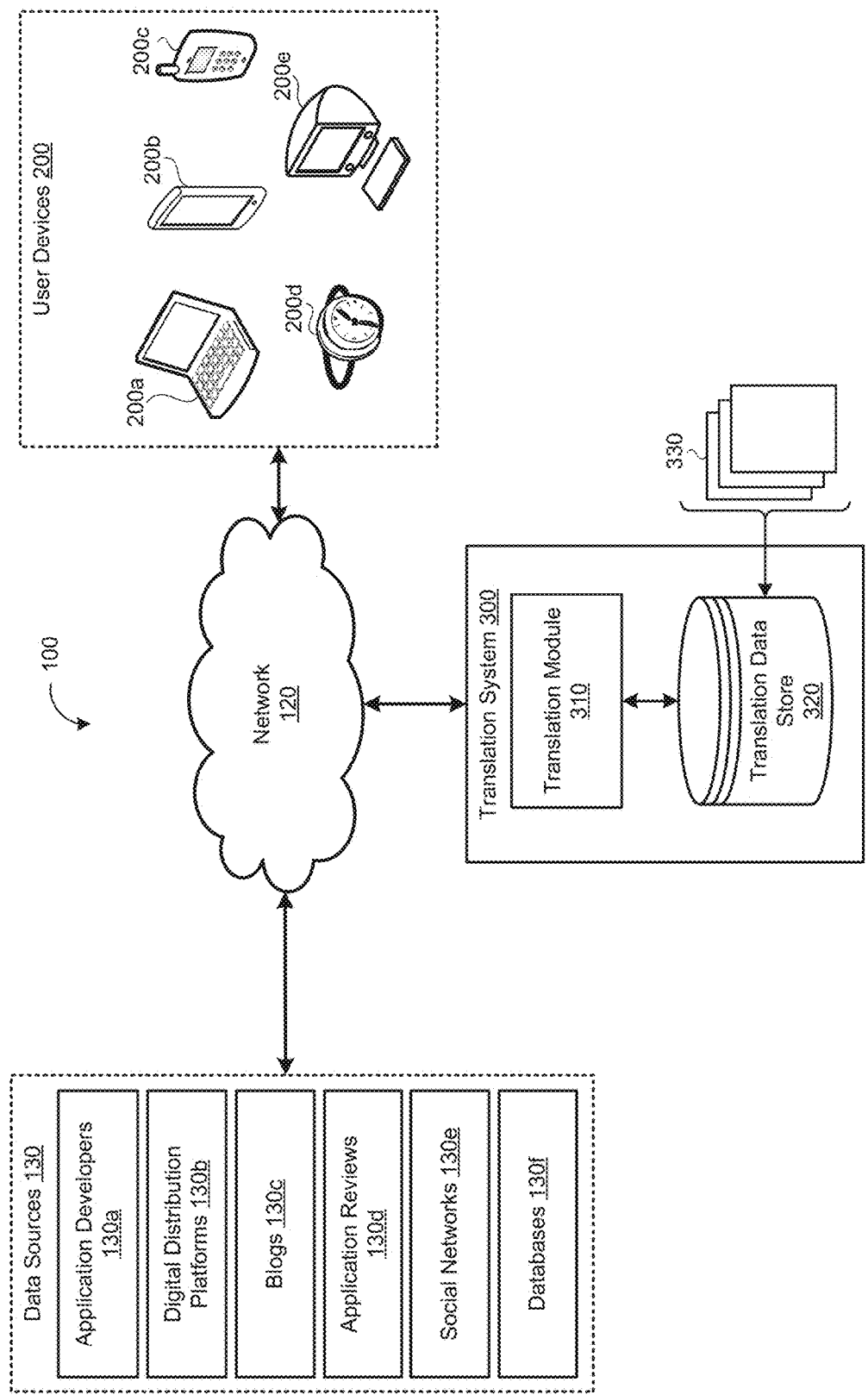
FIG. 1B is a functional block diagram of a translation system interacting with user devices and data sources.

FIGS. 1A and 1B illustrate an example environment 100 that includes a translation system 300. A translation system 300 is a collection of computing devices that can receive a translation request 260 indicating one or more application-independent functions and generate one or more application-specific functions in the form of user-selectable links to specific states of software applications. An application-independent function 336 may be a function that can be performed by one or more software applications, but does not require a particular software application in order to be performed. An application-independent function 336 may be associated with parameters that correspond to data values that may be used in the translation process. A completed application-independent function 336 may refer to an application-independent function 336 with a parameter value assigned to each of its parameters. An application-specific function may be the operations that a specific software application may use to implement an application-independent function 336. The translation system 300 can additionally transmit the user-selectable links to one or more user devices 200. A user-selectable link (or link) is an object that is displayed by a user device 200 that includes one or more underlying access mechanisms (described in greater detail below). When a user selects a user-selectable link, the user device 200 can access a state of a software application using an access mechanism included in the selected link. While the user device 200 in FIG. 1A is depicted as a smartphone, a user device 200 can be any suitable user computing device including, but not limited to, a tablet computing device, a personal computing device, a laptop computing device, a gaming device, a vehicle infotainment device, and/or a smart appliance (e.g., a smart refrigerator or smart television).

A user device 200 may use a variety of different operating systems 224. In examples where a user device 200 is a mobile device, the user device 200 may run an operating system including, but not limited to, ANDROID® developed by Google Inc. and IOS® developed by Apple Inc. In an example where a user device 200 is a laptop or desktop computing device, the user device 200 may run an operating system including, but not limited to, MICROSOFT WINDOWS® by Microsoft Corporation, MAC OS® by Apple, Inc., or Linux. A user device 200 may be configured to access the translation system 300 while running operating systems 224 other than those operating systems 224 described above, whether such operating systems 224 are presently available or developed in the future.

Software applications can perform a variety of different functions for a user. For example, a restaurant reservation application can make reservations for restaurants. As another example, an internet media player application can stream media (e.g., a song or movie) via the Internet. In some examples, a single software application can provide more than one function. For example, a restaurant reservation application may also allow a user to retrieve information about a restaurant and read user reviews for the restaurant in addition to making reservations. As another example, an internet media player application may also allow a user to perform searches for digital media, purchase digital media, generate media playlists, and share media playlists. Additional examples of software applications include, but are not limited to, productivity applications, social media applications, messaging applications, media streaming applications, social networking applications, and games. The functions of an application can be accessed using native application editions of the software application and/or web application editions of the software application. In some examples, a software application may also be referred to as an "application," "an app," or a "program."

A native application edition (or "native application") is, at least in part, installed on a user device 200. In some scenarios, a native application is installed on a user device 200, but accesses an external resource (e.g., an application server) to obtain data and/or instruction from the external resource. In such examples, a native application can provide data to and/or receive data from the external resource while accessing one or more functions of the software application. In other scenarios, a native application is installed on the user device 200 and does not access any external resources. For example, some gaming applications, calendar applications, media player applications, and document viewing applications may not require a connection to a network to perform a particular function. In these examples, the functionality of the software application is encoded in the native application edition itself. In this way, the native application edition is able to access the functions of the software application without communicating with any other external devices.

Web application editions (also referred to as "web applications") of a software application may be partially executed by a user device 200 (e.g., by a web browser executed by the user device 200) and partially executed by a remote computing device (e.g., a web server or application server). For example, a web application may be an application that is executed, at least in part, by a web server and accessed by a web browser (e.g., a native application) of the user device 200. Example web applications may include, but are not limited to, a web-based email client, an online auction website, a social-networking website, travel booking websites, and online retail websites. A web application accesses functions of a software product via a network. Example implementations of web applications include websites and/or HTML-5 application editions.

A software application can perform one or more functions. A function may refer to a service of the software application that can be accessed by a user device 200. Non-limiting examples of functions can include "make a restaurant reservation" (which may be parameterized with a restaurant identifier, a date, and a time), "search for a cuisine" (which may be parameterized with a cuisine type and a location), "view flight prices" (which may be parameterized with departure and arrival airport codes, arrival and departure dates, and round trip flags), "request a driver" (which may be parameterized with a pick-up location), and "view a file" (which may be parameterized with a file identifier). Each of the one or more functions provided by a software application may be accessed via an application state. An application state can refer to a page or screen within a software application. For example, an application state can be reached as a result of user interaction with the user device on which the native application is installed. A user device can access an application state using an access mechanism.

When rendering a user-selectable link (e.g., to an application-specific function included in a set of translation results 270 transmitted by the translation system 300) a user device 200 displays the user-selectable link such that it can be selected by a user of the user device 200. A user-selectable link may include one or more underlying access mechanisms 202 and associated link data. A user-selectable link, when selected by a user, causes the user device 200 to access a state of an edition of the software application identified by the access mechanism 202.

Access mechanisms 202 may include at least one of a native application access mechanism (hereinafter "application access mechanism"), a web access mechanism, and an application download mechanism. The user device 200 may use the access mechanisms to access functionality of applications. For example, the user may select a user selectable link including an access mechanism in order to access functionality of an application indicated in the user selectable link. As described herein, the translation system 300 may transmit one or more application access mechanisms, one or more web access mechanisms, and one or more application download mechanisms to the user device 200 in the translation results 270.

An application access mechanism 202 may be a string that includes a reference to a native application (e.g., one of native applications 204) and indicates one or more operations for the user device 200 to perform. If a user selects a user selectable link including an application access mechanism, the user device 200 may launch the native application referenced in the application access mechanism and perform the one or more operations indicated in the application access mechanism.

An application access mechanism 202 may include an application resource identifier and/or one or more operations for a user device 200 to perform. For example, an application resource identifier may be a string having an application specific scheme. The application resource identifier may include a reference to a native application and indicate one or more operations for the user device 200 (e.g., the native application) to perform. For example, the application resource identifier may include a reference to a native application, a domain name, and a path to be used by the native application to retrieve and display information to the user.

An example application resource identifier for a restaurant reservation application for the android operating system, such as OPENTABLE® (developed by OpenTable, Inc.), may be "vnd.opentable.deeplink://opentable.com/restaurant/profile?rid=88333&refid=1". A portion of the example application resource identifier references the OPENTABLE® native application. For example, the substring "vnd.opentable.deeplink" of the application resource identifier references the OPENTABLE® native application. The example application resource identifier also indicates one or more operations for the OPENTABLE® native application. For example, the OPENTABLE® native application may retrieve and display the information included in the application resource identifier domain and path defined by the substring "opentable.com/restaurant/profile?rid=88333&rfid=1". In response to receiving the application resource identifier, a user device 200 may launch the OPENTABLE® native application and display information retrieved from the location indicated in the application resource identifier. The application resource identifier may be provided by the application developer in some examples.

In some examples, the application access mechanism 202 may include operations for the user device 200 to perform in addition to operation(s) indicated in the application resource identifier. For example, the operating system of the user device 200 and/or a native application installed on the user device 200 may perform the operations included in the application access mechanism 202 in order to set the native application into an application state specified by the application access mechanism 202. In some examples, the operations may be included in a script. Examples of operations may include, but are not limited to, launching a native application, waiting for the native application to start, creating and sending a translation request to a server, setting a current geo-location in a native application, making a restaurant reservation, sending a text message, and adding an appointment to a calendar.

In some implementations, the application access mechanism 202 may not include an application resource identifier. Instead, the application access mechanism 202 can include other operations that reference a native application. The operations may be performed by the user device 200. The one or more operations may include instructions for at least one of a native application and the operating system on the user device 200. In response to selection of the application access mechanism 202, the user device 200 may perform the operations included in the application access mechanism 202. In some examples, the operations may be included in a script. A script is a set of instructions, that when executed by the user device 200 cause the user device to access a resource indicated by the script. For example, the script may instruct an operating system of the user device 200 to launch the native application, and may define one or more additional instructions to access a particular state of the application. A script may be used instead of another type of access mechanism when an application is not configured to be referenced by the other types of access mechanisms.

The application access mechanism 202 may also include edition information that indicates the application edition with which the application access mechanism 202 is compatible. For example, the edition information may indicate the operating system with which the application access mechanism 202 is compatible. The translation system 300 may utilize information provided in a translation request 260 (e.g., platform data 222) to ensure that it transmits translation results 270 including access mechanisms that are compatible with the user device 200.

In some implementations, an application resource identifier is an application specific resource identifier that is defined by the developer of the application. In this example, the user device receives the application resource identifier and the operating system may send the application resource identifier to the native application referenced in the application resource identifier. The native application referenced in the application resource identifier launches and is set into the state specified by the application resource identifier.

In some examples, an application function may not be accessible using an application resource identifier. For example, a function of the application may not include a corresponding application resource identifier that the application may use to perform the function. As another example, some applications may not be configured to receive an application resource identifier. In these examples, an application access mechanism 202 for the native application can include one or more operations that cause the native application to perform the function that may not otherwise be accessible using an application resource identifier. For example, the user device 200 may receive the one or more operations and execute the one or more operations to set the native application into the desired application state. In a specific example, the one or more operations may include launching the native application along with additional operations for the native application to perform. For example, the user device 200 may initially trigger the native application to start and then wait for a period of time for the native application to start. Then the user device 200 may perform additional operations included in the received application access mechanism 202, such as selecting an element in a graphical user interface of the native application. In other examples, a native application may be configured to directly receive the operations transmitted by the translation system 300. In these examples, the native application may be launched according to the application access mechanism and then the launched native application may directly perform the operations received from the translation system 300.

A web access mechanism may include a resource identifier that includes a reference to a web resource (e.g., a page of a web application/website). For example, a web access mechanism may include a uniform resource locator (URL) (i.e., a web address) used with hypertext transfer protocol (HTTP). If a user selects a user selectable link including a web access mechanism, the user device 200 may launch a web browser application and retrieve the web resource indicated in the resource identifier. Put another way, if a user selects a user selectable link including a web access mechanism, the user device 200 may launch the web browser application and access a state (e.g., a page) of a web application/website. In some examples, web access mechanisms may include URLs for mobile-optimized sites and/or full sites.

An application download mechanism may indicate a site (e.g., a digital distribution platform) where a native application can be downloaded in the scenario where the native application is not installed on the user device 200. If a user selects a user selectable link including an application download address, the user device 200 may access a digital distribution platform from which the referenced native application may be downloaded. The user device 200 may access a digital distribution platform using at least one of a web browser application and one of the native applications 204.

As depicted by FIGS. 1A and 1B, the environment 100 additionally includes a user device 200 associated with a user 10 in communication with a remote system 110 via a network 120. The remote system 110 may be a distributed system (e.g., a cloud environment) having scalable/elastic computing resources 112 and/or storage resources 114. The user device 200 and/or the remote system 110 may execute the translation system 300 and optionally acquire data from one or more data sources 130.

In some implementations, the translation system 300 includes a translation module 310 and a translation data store 320 in communication with each other. The translation module 310 may be executed on the remote system 110. Although the translation module 310 can be executed on the remote system 110, in some implementations, the user device 200 may implement similar functionality as that attributed to the translation module 310 implemented on the remote system 110. Accordingly, the translation module 310 is illustrated in FIG. 1A as being included on the user device 200 in some implementations. The translation data store 320 may include one or more databases, indices (e.g., inverted indices), tables, files, or other data structures which may be used to implement the techniques of the present disclosure. FIG. 1B depicts a plurality of data sources 130. The data sources 130 may be sources of data that the translation system 300 (e.g., via the translation module 310) may use to generate and update the translation data store 320. The data retrieved from the data sources 130 can include any type of data related to application functionality. Data retrieved from the data sources 130 may be used to create and/or update one or more databases, indices, tables, files, or other data structures included in the translation data store 320. For example, translation records 330 may be created and updated based on data retrieved from the data sources 130. In some examples, some data included in the data store 320 may be manually generated by a human operator.

Figure 1C:
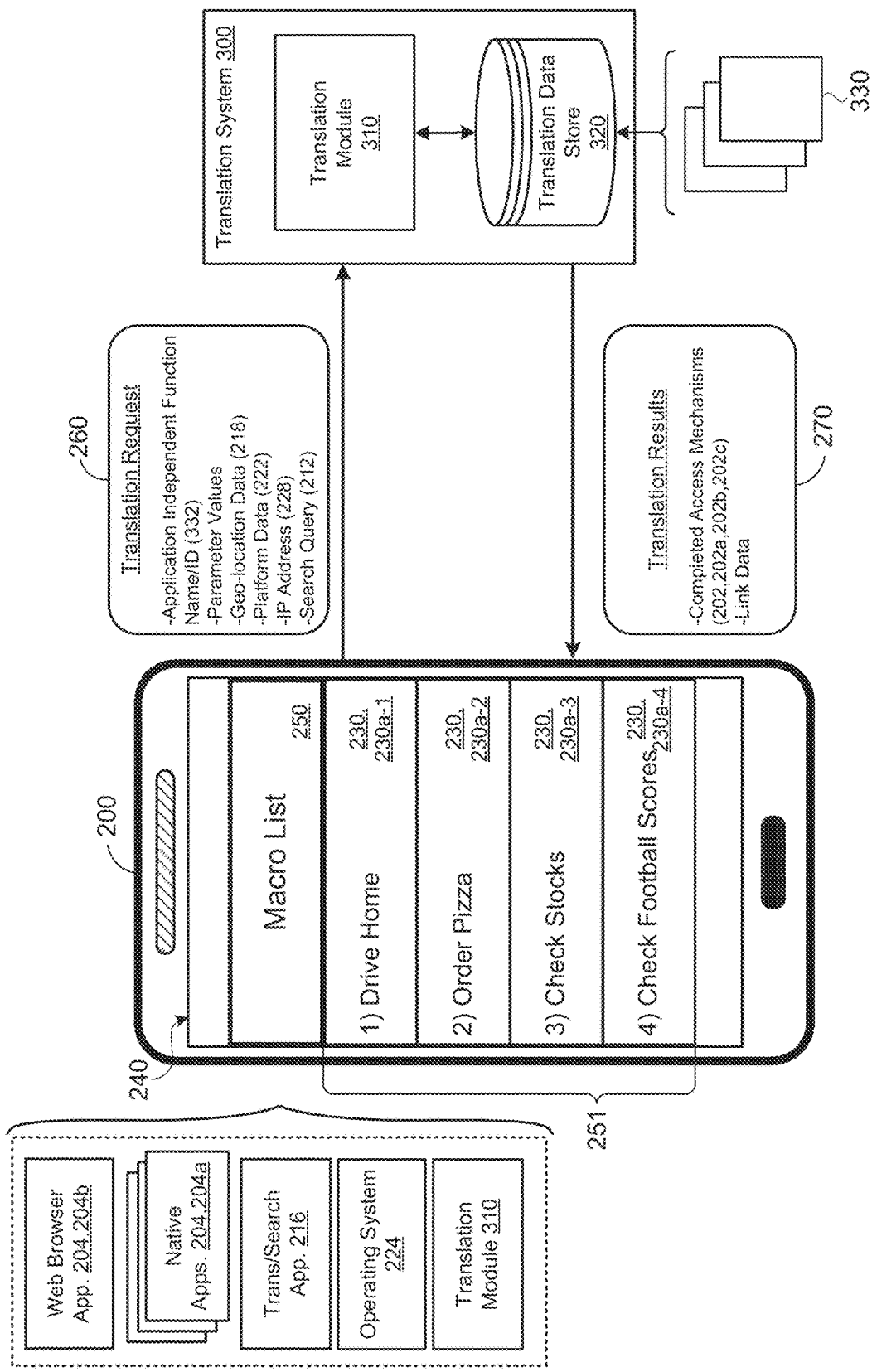
FIG. 1C is a schematic view of an example user device in communication with a translation system.

FIG. 1C illustrates an example translation module 310 configured to receive a translation request 260 and generate translation results 270 based on data included in the translation request 260 and the translation data store 320. In some implementations, the translation module 310 can receive a translation request 260 from the user device 200. The translation module 310 can translate the one or more application-independent functions 336 indicated by the translation request 260 (e.g., via an application-independent function name/ID 332) into one or more application-specific functions using the translation records 330 of the translation data store 320. The translation records 330 of the translation data store 320 can include one or more access mechanism templates 340. The translation records 330 may additionally include template rules 342 that the translation module 310 may follow to generate completed access mechanisms 202 that correspond to the parameter values provided by the translation request 260. For example, the translation module 310 may insert parameter values (e.g., parameter values included in the translation request 260) into an access mechanism template 340 according to template rules 342 of a translation record 330 associated with the application-independent function name/ID 332 of the translation request 260. In some implementations, the user device 200 may automatically include additional data in a translation request 260. In these examples, the translation module 310 may utilize the additional information provided in the translation request 260, such as geo-location data 218 or a platform data 222, to generate a completed access mechanism. For example, the translation module 310 may utilize an access mechanism template 340 corresponding to a device platform indicated by the platform data 222 of the translation request 260. In this way, the translation module 310 may generate a completed access mechanisms tailored specifically to the requesting device (e.g., the user device 200). The translation module 310 can transmit translation results 270 including completed access mechanisms 202 to the user device 200 that generated the translation request 260. The user device 200 can utilize the completed access mechanisms to access application-specific functions for a variety of different applications 204, such as a native application 204 installed on the user device 200. The translation results 270 can be rendered and displayed by the user device 200 as user-selectable links 230. In this way, a user of the user device 200 can access application-specific functions by selecting a link 230 included in the translation results 270.

The translation module 310 is configured to receive a translation request 260 from a user device 200 via the network 120. The translation request 260 can include an application-independent function name or identifier (ID) 332, parameter values corresponding to the application-independent function name/ID 332, and other data related to the user device 200 and/or its user 10 (e.g., geo-location data 218 and/or platform data 222). In some implementations, the application-independent function name/ID 332 may represent an application-independent function 336 selected by a user of the user device 200 (e.g., via a previously generated macroinstruction, discussed in detail herein). More specifically, the translation request 260 may be directed to retrieving a list of links 230 to application-specific functions that satisfy a user's desire to access a particular application-independent function. In other implementations, a translation request 260 may include a search query that indicates a request for information retrieval (e.g., a search for a particular type of restaurant, a search for applications or web content, or any other search query not specifically oriented towards retrieving application-specific functions). In this example, the translation module 310 may map the contents of the translation request 260 (e.g., a search query included in the translation request 260) to one or more translation records 330 using key-word based text matching (e.g., by matching the terms of the search query to searchable translation information 334) or in any other suitable manner. In these implementations, the translation module 310 may further rank the translation records 330 of the matched application-independent functions based on how well terms of a search query 212 and/or other information included in a translation request 260 correspond to the searchable translation information 334 of the translation records 330. In this way, the translation module 310 may select the highest ranked translation records 330 to be the basis for the translation results 270.

The translation request 260 may also include additional data along with an application-independent function name/ID 332. For example, the translation request 260 may include geo-location data 218 that indicates the location of the user device 200, such as latitude and longitude coordinates. The user device 200 may include a global positioning system (GPS) receiver that generates the geo-location data 218 transmitted in the translation request 260. The translation request 260 may additionally or alternatively include an IP address 228, which the translation module 310 may use to determine the location of the user device 200. In some implementations, the translation module 310 may detect a location (e.g., a postal address, street name, city name, etc.) specified in the translation request 260. In some examples, the translation request 260 may also include additional data, including but not limited to, platform data 222 (e.g., a version of the operating system 224, device type, and/or web-browser version), an identity of a user 10 of the user device 200 (e.g., a username), partner-specific data, and any other suitable data. The translation module 310 uses the application-independent function name/ID 332 and the additional data included in the translation request 260 to generate translation results 270.

Figure 2A:
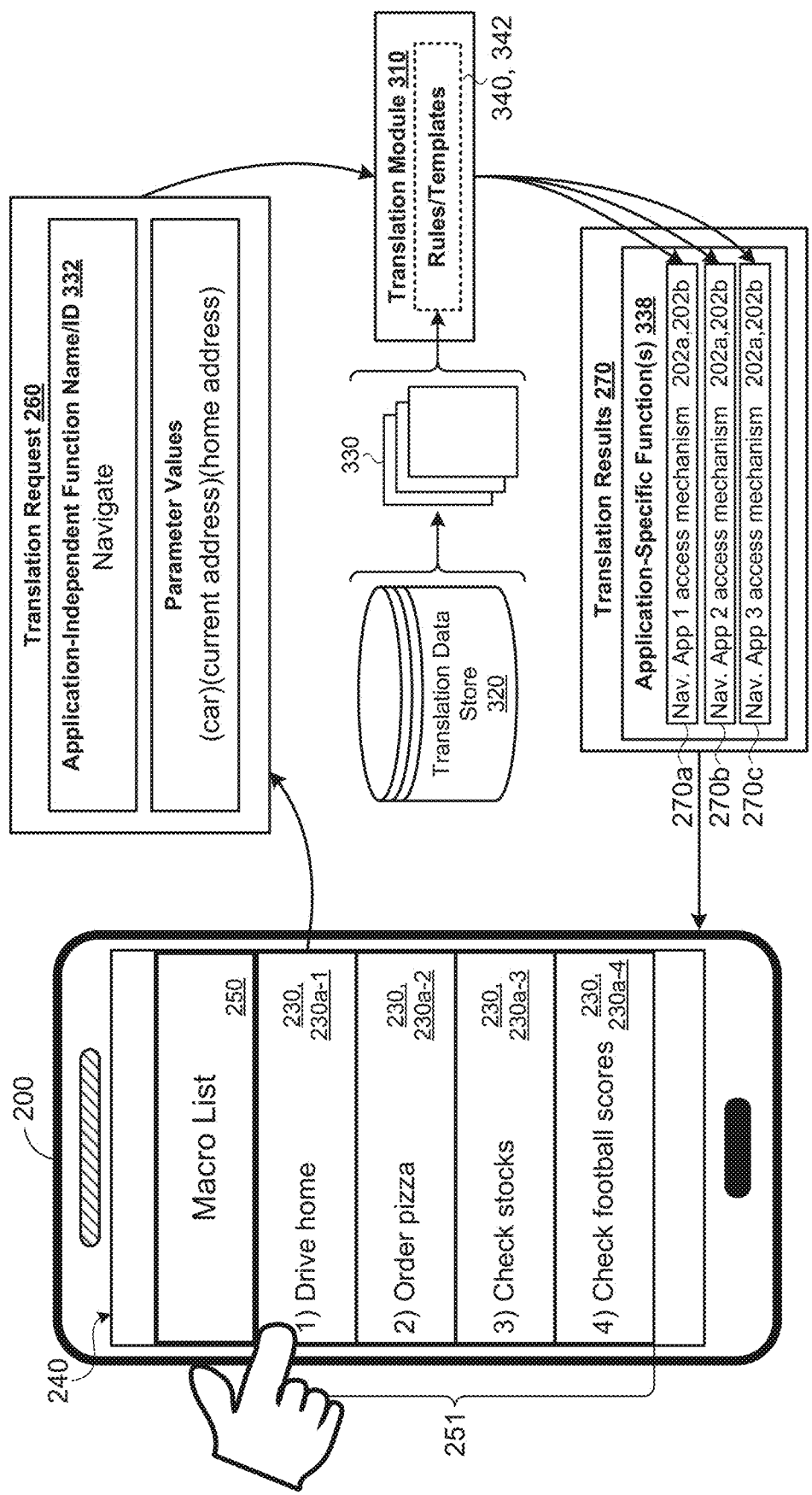
FIG. 2A is a schematic view of an example translation module receiving and processing a translation request and outputting translation results.

FIG. 2A illustrates an example translation module 310 configured to translate an application-independent function 336 (e.g., indicated by an application-independent function name/ID of a translation request 260) into one or more application specific-functions 338 (e.g., translation results 270) in response to a received translation request 260. As described herein, an application-specific function refers to the operations that a specific application 204 may use to perform the application-independent function 336. For example, an application-specific function may refer to the operations indicated by a native application access mechanism 202a (or web access mechanism 202b) that cause a user device 200 (e.g., a native application 204a being executed on the user device 200) to perform the application-independent function 336 in a manner consistent with a specific application 204. In some implementations, the native application access mechanism 202a may be a completed access mechanism generated using an access mechanism template 340 and corresponding template rules 342.

In one example, an application-independent function 336 may be "Navigate." In this example, the function "Navigate" may be associated with the parameters "(method of transportation)", "(departure location)", and "(destination location)", where the method of transportation may be user-selectable from different methods of transportation such as via car, bike, train, walking, or any other method of transportation (e.g., via list displayed on the user device 200). The "(departure location)" parameter may be determined by the translation module 310 based on the geo-location data 218 of the translation request 260 (e.g., the geo-location data 218 can indicate the user's current address), or may be provided explicitly by the user (e.g., via a user-generated macroinstruction, discussed in detail below). In the example depicted by FIG. 2A, a user of the user device 200 selects a user-selectable link entitled "drive home," which can be a user-generated or automatically-generated macro that invokes the function "Navigate" with previously designated parameter values (e.g., a home address as the value for a destination parameter). A user 10 can manually generate the completed application-independent functions (i.e., macros) or download completed application-independent functions generated by other users. User-generated and automatically-generated macroinstructions are discussed in more detail below with respect to FIGS. 5A-5C. Returning to FIG. 2A, when the user selects the user-selectable link 230a-1 entitled "drive home," the translation module 310 provides the user device 200 with translation results 270 including native access mechanisms 202a (or web access mechanisms 202b) that may be rendered and displayed as user-selectable links by the user device 200. Upon selection by a user 10, the user-selectable links representing the translation results 270 invoke a respective application-specific function that causes the user device 200 to navigate the user 10 by car from the user's current location to the user's home address. As shown by FIG. 2A, when the user 10 selects the user-selectable link 230a-1 entitled "drive home," three different application access mechanisms 202a (or web access mechanisms 202b) in the form of user-selectable links (corresponding to three different navigation applications 270a, 270b, 270c, respectively) may be selected to execute the application-independent function.

In addition to the "Navigate" function, application-independent functions may include, but are not limited to, one or more of the functions shown in table 1:

TABLE 1

| Application-Independent function | Parameters | Examples of Completed Application-independent Functions |
|---|---|---|
| Navigate | (method of transportation) (departure location) (destination location) | User selected name: Drive Home Function: Navigate (car)(current location) (home address) User selected name: Drive to work Function: Navigate (car)(current location) (work address) |
| Find a business | (type of business) (location) (price range of goods/services) | User selected name: Find nearest gas station Function: Find a business(Gas Station)(near me) |
| Play music | (playlist) (genre) | User selected name: Workout music Function: Play(gym playlist) |
| Watch movie | (movie name) | User selected name: Play my movie Function: Play (The Notebook) |
| Find Game | (sport) (location) | User selected name: Football games near me Function: Find(Football)(current location) |
| Read Reviews | (business type) (current location) (business name) | User selected name: Restaurant reviews Function: Reviews(restaurant)(near current location) |
| Cook | (cuisine) (recipe) | User selected name: Find chicken recipes Function: Cook(chicken) |
| Stock Prices | (stock symbols) | User selected name: Check my stocks Function: Stock Prices (AAPL, MSFT, YHOO) |
| Weather | (zip code) (city) (address) | User selected name: Current weather Function: Weather(48309) |
| Sports Scores | (sport type) (team) (time) (league) | User selected name: Football Scores Function: Sports Scores(football)(NFL)(present day) |

TABLE 1-continued

| Application-Independent function | Parameters | Examples of Completed Application-independent Functions |
|---|---|---|
| Order Food | (Cuisine type) (Dish type) (Price) (Dine in/delivery) | User selected name: Chinese Carry out Function: Order(Chinese) |
| Find Movie | (online/theater) (genre) (actor/actress) (director | User selected name: Action movies Function: Find (theater)(action) |

As depicted by the non-limiting examples in Table 1, an application-independent function 336 may be associated with one or more parameters. For example, the "Navigate" application-independent function includes parameters such as a departure location, a destination location, and a method of transportation.

As depicted by FIG. 1C, the translation system 300 may include a translation data store 320 and be configured to receive a translation request 260. The translation data store 320 can be in communication with the translation module 310 and store translation records 330. The translation records 330 can include data that defines how to translate an application-independent function 336 into one or more application-specific functions. For example, the translation records 330 may include access mechanism templates 340 and template rules 342 that allow the translation module 310 to translate application-independent functions 336 into application-specific functions. The template rules 342 may indicate to a translation module 310 how to use an access mechanism template 340 and parameter values of a translation request 260 to generate a completed access mechanism. In this example, the completed access mechanism may correspond to an application-specific function capable of performing an application-independent function 336 indicated by a translation request 260. The translation module 310 may utilize different access mechanism templates 340 and template rules 342 for different applications 204 that perform the same functions. Each translation record 330 corresponding to an application-independent function 336 may include several access mechanism templates 340 and template rules 342 corresponding to the various application-specific functions capable of performing the application-independent function 336. For example, in FIG. 2A the translation module 310 may translate the "Navigate" application-independent function (represented by the user-selectable link 230a-1 entitled "drive home") using a different access mechanism template 340 and corresponding template rules 342 for each of the navigation applications 270a, 270b, 270c, respectively.

Figure 2B:
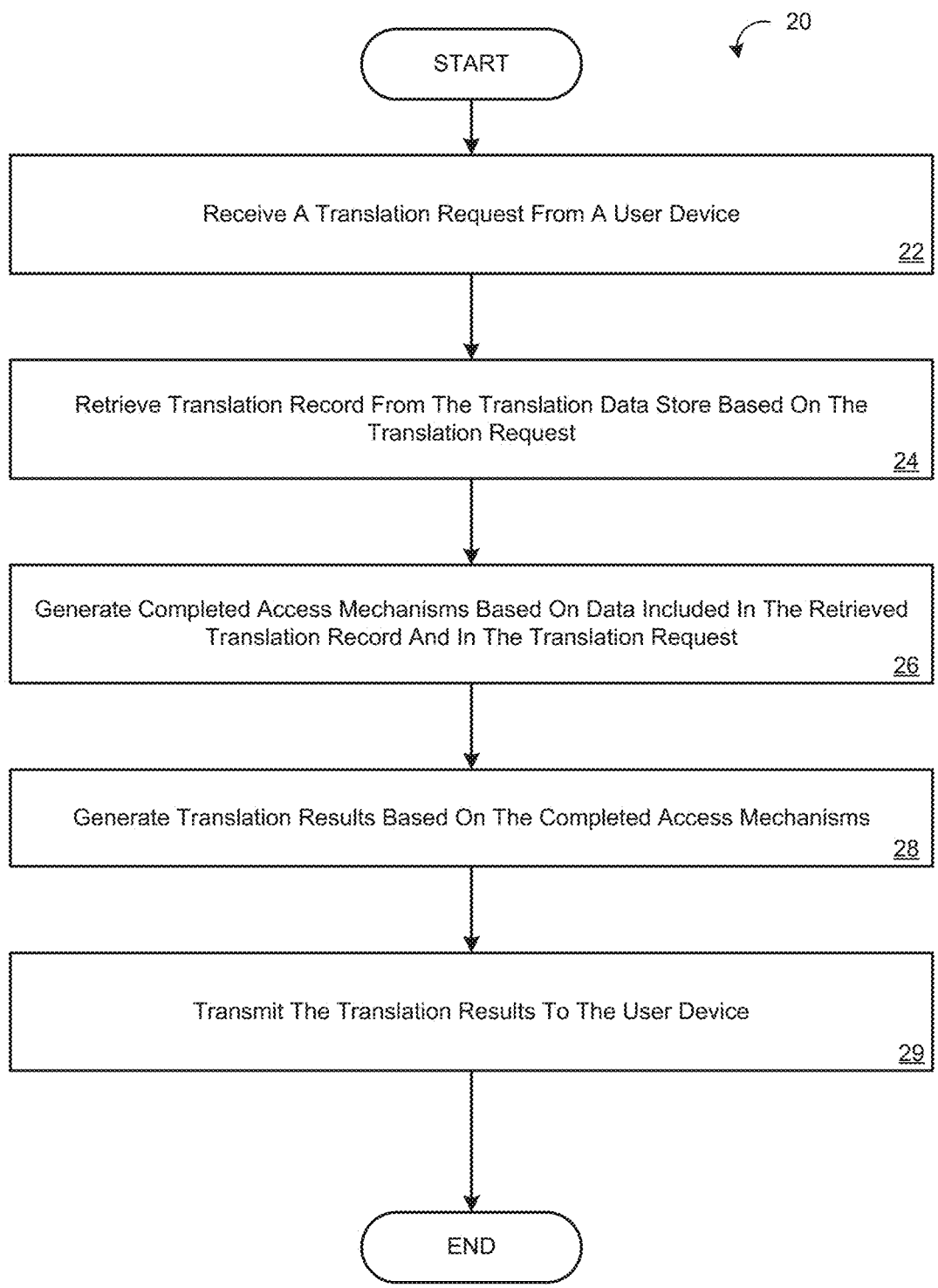
FIG. 2B is a flow diagram of an arrangement of operations for a method of performing a translation based on a translation request received from the user device.

FIG. 2B provides an example arrangement of operations for a method 20 of translating an application-independent function 336 into one or more application-specific functions. At block 22, the translation system 300 receives a translation request 260 from a user device 200. The translation request 260 may include an application-independent function name/ID 332. The translation request 260 may additionally include one or more user-selected parameter values corresponding to the application-specific function 336 indicated by the application-independent function name/ID 332. In some implementations, the user device 200 may automatically include additional data in the translation request 260 such as geo-location data 218, device platform data 222, or any other data. For example, as depicted by FIG. 2A, parameter values corresponding to the application-independent function name/ID 332 may be "car", "current address", and "home address." In this example, the parameter value "car" may have been manually selected by a user during the creation of a macro (discussed in more detail herein with respect to FIGS. 5A-5C). The parameter value "current address" corresponding to the parameter "(departure location)" may have been derived by the translation module 310 based on geo-location data 222 automatically included in the translation request 260 by the user device 200. The parameter value "home" corresponding to the parameter "(destination location)" may be a pre-designated value that a user of the user device 200 may assign to several macros (i.e., "home" may correspond to an address stored on the user device 200 and accessible by several macros).

At block 24, the translation module 310 retrieves a translation record 330 corresponding to the application-independent function name/ID 332 of the translation request 260. At block 26, the translation module 310 generates one or more completed access mechanisms corresponding to application-specific functions using the data included in the retrieved translation record 330 and in the translation request 260. More specifically, the translation module 310 selects an access mechanism template 340 from the retrieved translation record 330 that corresponds to the parameter values included in the translation request 260. For example, returning to FIG. 2A, the translation record 330 corresponding to the application-independent function 336 "Navigate" may include access mechanism templates 340 that correspond to several different navigation applications, one or more of which may not accept a "(method of transportation)" parameter value (e.g., an application designed specifically for navigating users through a public transportation system). In the example illustrated by FIG. 2A, a user 10 of the user device 200 provides a "car" as a parameter value for the parameter "(method of transportation)" by selecting a macro entitled "Drive home." In this example, the translation module 310 may generate completed access mechanisms (i.e., application-specific functions) based on access mechanism templates 340 for applications that accept parameter values for the "(method of transportation)" parameter, such as the GOOGLE® Maps application (developed by Google, Inc.).

In some implementations, the translation module 310 may generate a completed access mechanism for each access mechanism template 340 of the translation record 330 that accepts the parameter values provided by the translation request 260. In some implementations, the translation request 260 may not include enough parameter values to satisfy the requirements of an access mechanism template 240. In these examples, the translation module 310 may instruct the user device 200 to request parameter values from a user 10 of the user device 200. For example, the translation module 310 may instruct the user device 200 to generate a pop-up window (not shown) in a graphical user interface (GUI) of the user device 200, whereby the GUI allows a user to select or input a parameter value that may be transmitted to the translation module 310. In some implementations, an access mechanism template 340 may utilize default parameter values (e.g., defined by an application developer or system operator) instead of (or in addition to) prompting a user 10 of the user device 200 to provide parameter values.

At block 28, the translation module 310 generates translation results 270 based on the completed access mechanisms. Each completed access mechanism may be used by the user device 200 to access an application-specific function. The translation module 310 may configure the translation results 270 to be rendered by the user device 200 as user-selectable links to application states capable of performing the application-independent function 336 indicated by the translation request 260.

In some implementations, the translation module 310 may rank the completed access mechanisms included in the translation results 270. In one example, the translation module 310 may generate a relevance score for each completed access mechanism, whereby the relevance score indicates the relevance of the completed access mechanism to the translation request 260. In this example, the translation module 310 may generate a relevance score based on the percentage of parameter values accepted by the access mechanism template 340 used to generate the completed access mechanism, whereby a higher relevance score indicates that the completed access mechanism may be generated using a large number of the parameter values provided by the translation request 260. In another example, the translation module 310 may generate a popularity score for each completed access mechanism, whereby the popularity score indicates the relative popularity of the underlying application state of a completed access mechanism. In this example, the translation module 310 may generate a popularity score based on data retrieved from the data sources 130 indicating the number of times the underlying application of the completed access mechanism has been downloaded. In this example, a higher popularity score may indicate that the underlying application of a completed access mechanism has been downloaded many times. In examples where the translation module 310 generates a score (e.g., a relevance score or a popularity score), the translation module 310 may rank the completed access mechanisms in the translation results 270 according to their score, such that the user-selectable links corresponding to the completed access mechanisms are displayed on the user device 200 in a manner consistent with their rank. At block 29, the translation module 310 transmits the translation results 270 to the user device 200.

Figures 3A, 3B:
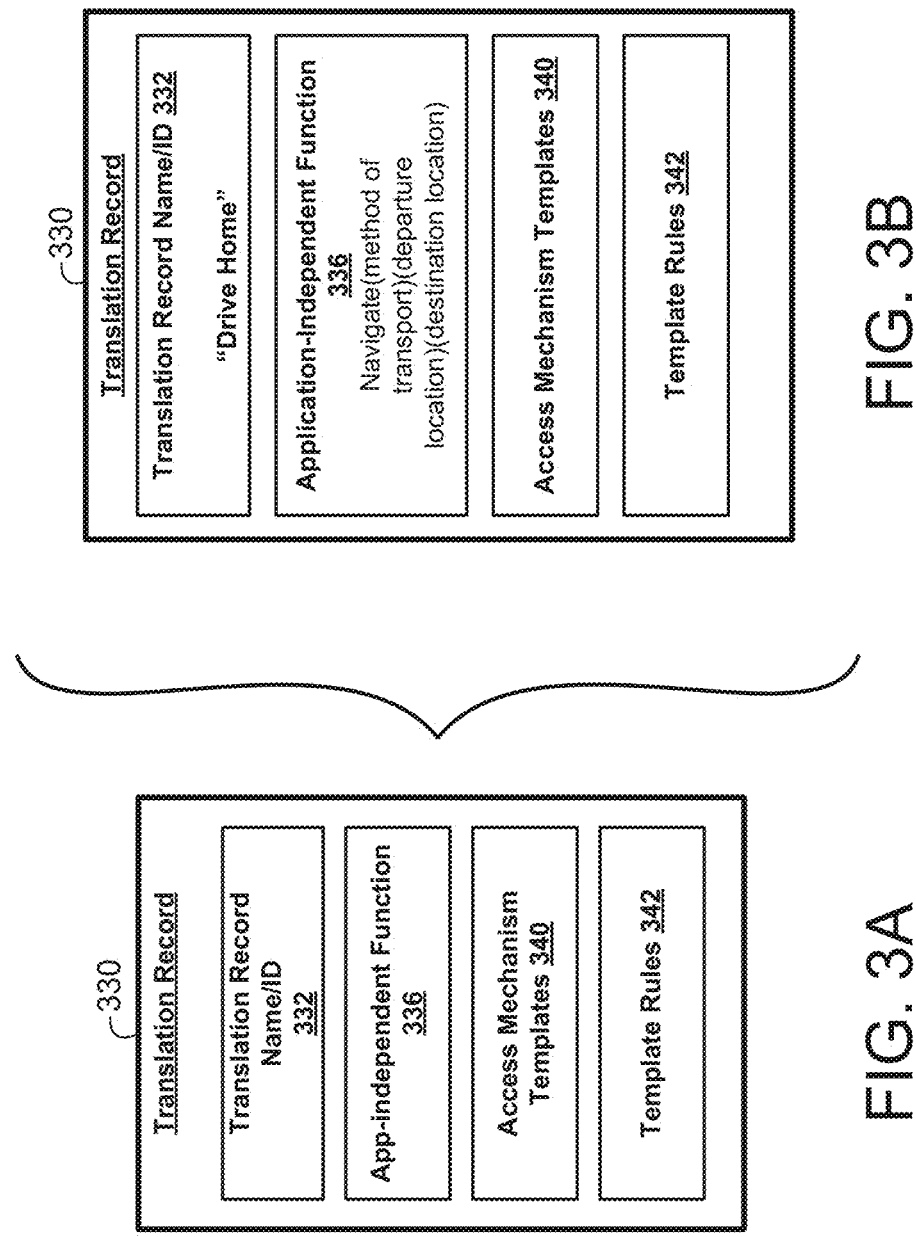
FIGS. 3A and 3B are schematic views of example translation records.

FIGS. 3A and 3B illustrate an example translation record 330 that may be included in a translation data store 320 storing a plurality of different translation records 330. Each translation record 330 may include data related to an application-independent function and/or one or more states of an application resulting from performance of a function (e.g., an application-specific function). A translation record 330 may include a translation record name or identifier (ID) 332, an application-independent function 336, access mechanism templates 340, and template rules 342. The access mechanisms templates 340 and template rules 342 may be utilized by the translation module 310 to generate completed access mechanisms capable of being used by a user device 200 to perform an application-specific function associated with the application-independent function 336.

The translation record ID 332 may be used to identify the translation record 330 among other translation records 330. The translation record ID 332 may be a string of alphabetic, numeric, and/or symbolic characters (e.g., punctuation marks) that uniquely identifies the associated translation record 330. The translation record ID 332 may include a function name associated with the application-independent function 336. A translation record 330 can further indicate one or more parameters that may be associated with the application-independent function 336.

FIGS. 4A and 4B illustrate an example of a user 10 selecting an application-independent function. The user may select a user-selectable link 230a-1, 230a-2, 230a-3, 230a-4, which causes the GUI 240 to display a pop-out window 280. The pop-out window 280 indicates one or more native applications 204a (or web applications 204b) for completing the function selected by the user 10. In the example shown in FIGS. 4A and 4B, the user 10 selects the user-selectable link entitled "Drive home" 230a-1, causing the GUI 240 to display a pop-out window 280 indicating three native applications 204a (Nav. App 1, Nav. App2, and Nav. App3) capable of performing the application-independent function selected by the user (in this case, provide the user directions home). In some examples, the user 10 may prefer one native application 204a over the other native applications 204a indicated by the pop-out window 280. The user 10 may indicate (e.g., using a check box 282) that the user 10 wants to use a particular application to perform the application-independent function. For example, the user 10 first selects the "Drive home" link 230a-1, then the user 10 decides to use Nay. App 1 to complete the application-independent function of navigating the user to their home. The user 10 may additionally check the check box 282 indicating to the user device 200 that the user 10 wants to use Nav. App 1 to complete the application-independent function in the future. In some examples, the GUI 240 may allow the user 10 to select an option to use the last selected or most recently used native application 204a.

FIGS. 5A-5C illustrate an example of a user 10 generating a macro. In some examples, such as the example depicted in FIG. 5A, the macro list header 250 includes a user-selectable indicator 290 that allows the user 10 to add more macros in the form of user-selectable links 230 to a macro list 251. The user 10 may select the user-selectable indicator 290 in order to start generating a macro associated with the macro list header 250. In FIG. 5B, the user 10 enters a name for the macro in the text box 291 using a device keyboard 201, whereby the macro's name corresponds to the application-independent function(s) 336 the user wants to make accessible via the macro list 250. In FIG. 5C, the GUI 240 displays a function list 294 whereby a user 10 can associate a macro name 292 with one or more application-independent functions 336 displayed in the list of application-independent functions 294. The function list 294 includes application-independent functions 336 such as those listed in Table 1 above. After selection of one or more application-independent functions 336 from the list of application-independent functions 294, the GUI 240 can accept parameter values, which may be displayed in a parameter value list 296 or entered manually by a user 10. As shown in FIG. 1C, the parameter value list 296 is displaying values for the parameter "(sports type)". In this example, the options may be, but are not limited to, baseball, football, hockey, and golf. The user 10 may select the parameter value "Football" to complete the creation of the macroinstruction. In some examples, the user 10 may be presented with additional parameter values for any remaining parameters associated with the application-independent function. In the football example, additional values that may be presented to the user 10 may include, but are not limited to, values such as specific football teams (e.g., "49ers") or leagues (e.g., "National Football League"). In some implementations, the user 10 may store the macros incorporating one or more application-independent functions 336 and transmit them via a network 120 to one or more other user devices 200.

Figure 6A:
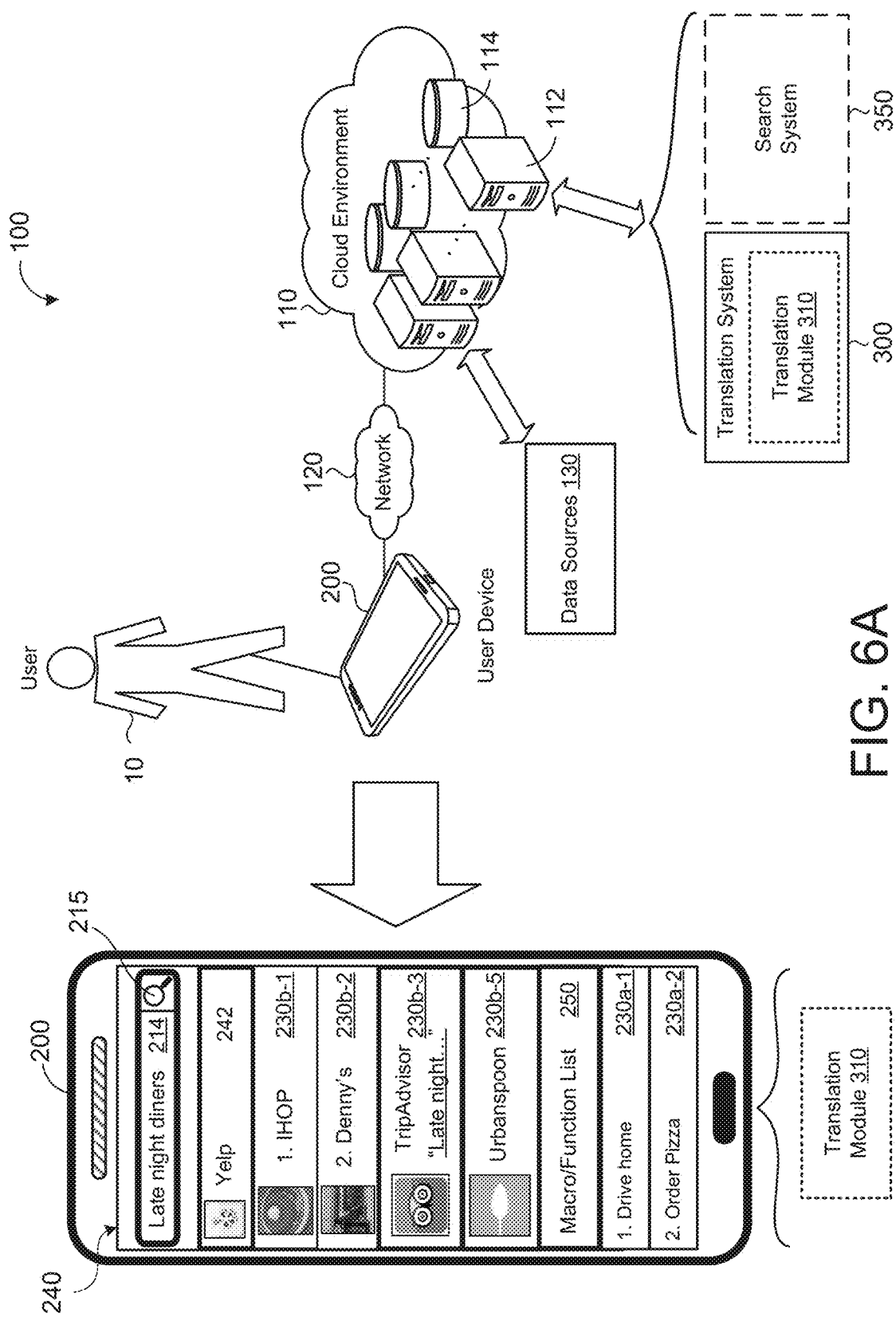
FIG. 6A is a schematic view of an example environment including a user device in communication with a translation system and a search system.
Figure 6B:
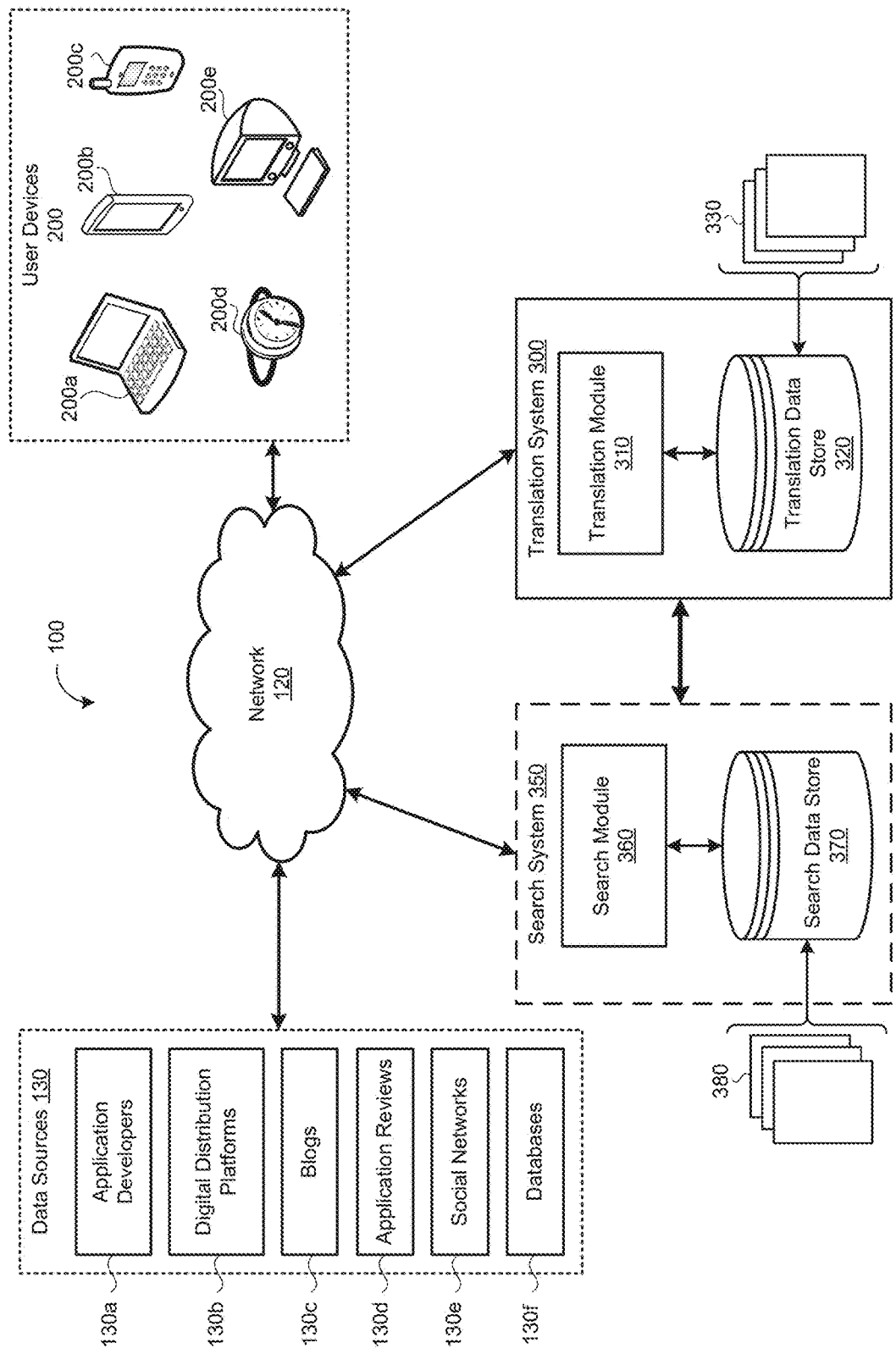
FIG. 6B is a functional block diagram of an example translation system and a search system interacting with user devices and data sources.
Figure 6C:
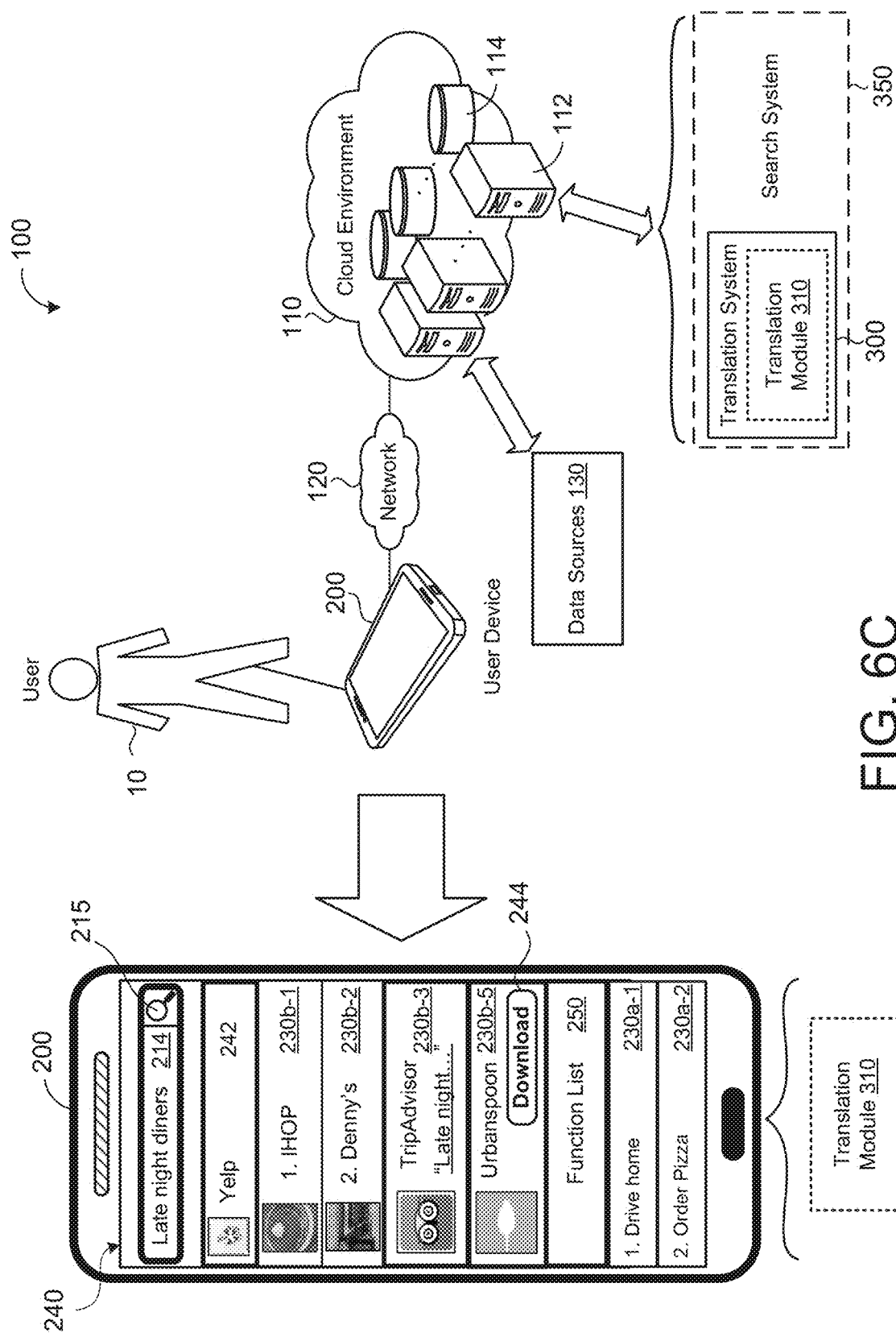
FIG. 6C is a schematic view of an example environment including a user device in communication with a translation system being part of a search system.
Figure 6D:
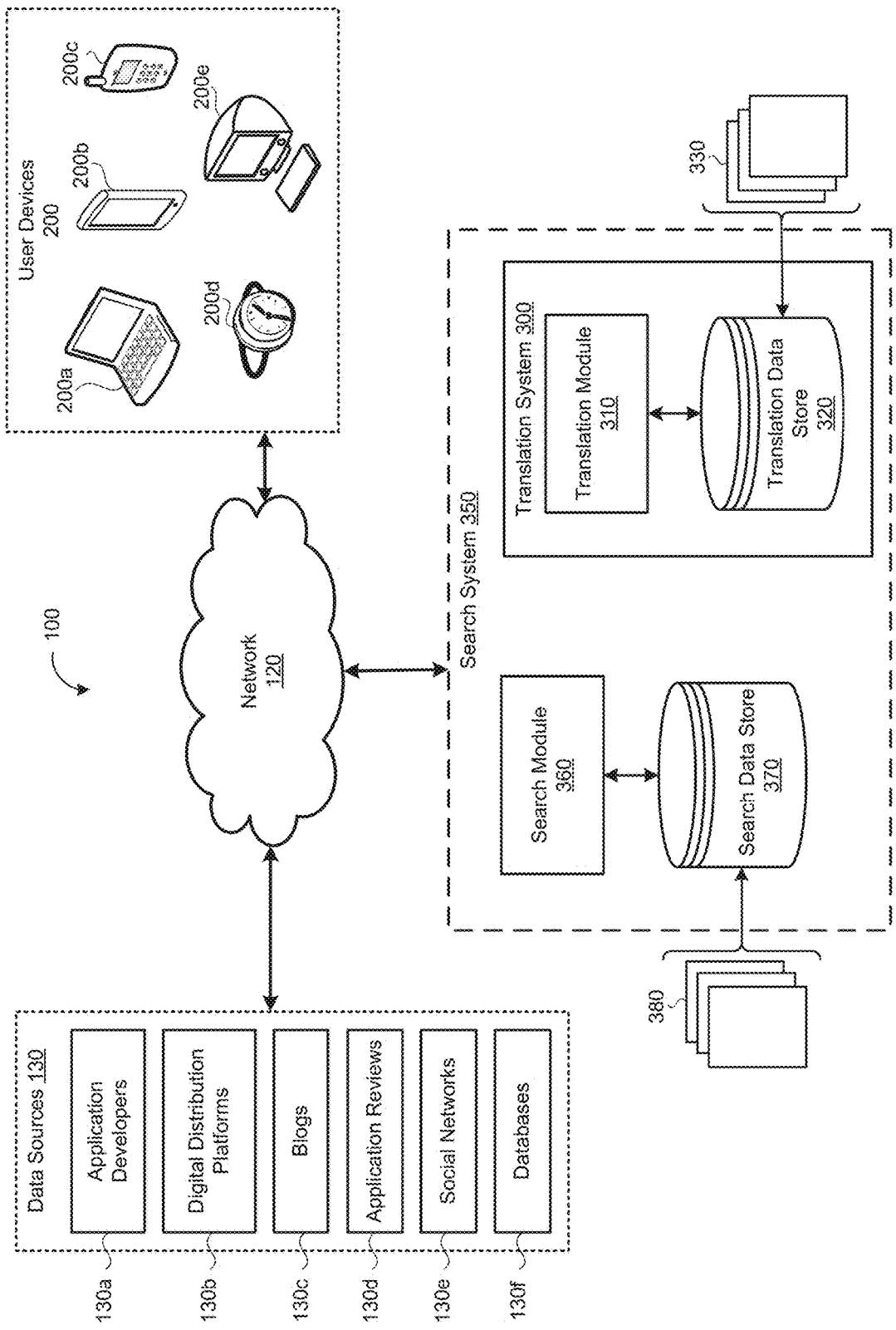
FIG. 6D is a functional block diagram of example user devices in communication with a translation system being part of a search system.

As shown in FIGS. 6A-6D, the user device 200 and/or the remote system 110 may additionally execute a search system 350. As shown in FIGS. 6A and 6B, the translation system 300 and the search system 350 may be separate systems in communication with each other. However, in some examples, and as shown in FIGS. 6C and 6D, the translation system 300 may be a part of the search system 350. The translation system 300 and the search system 350 communicate with one or more user devices 200 and the data source(s) 130 via the network 120. The network 120 may include various types of networks, such as a local area network (LAN), wide area network (WAN), and/or the Internet.

Figure 6E:
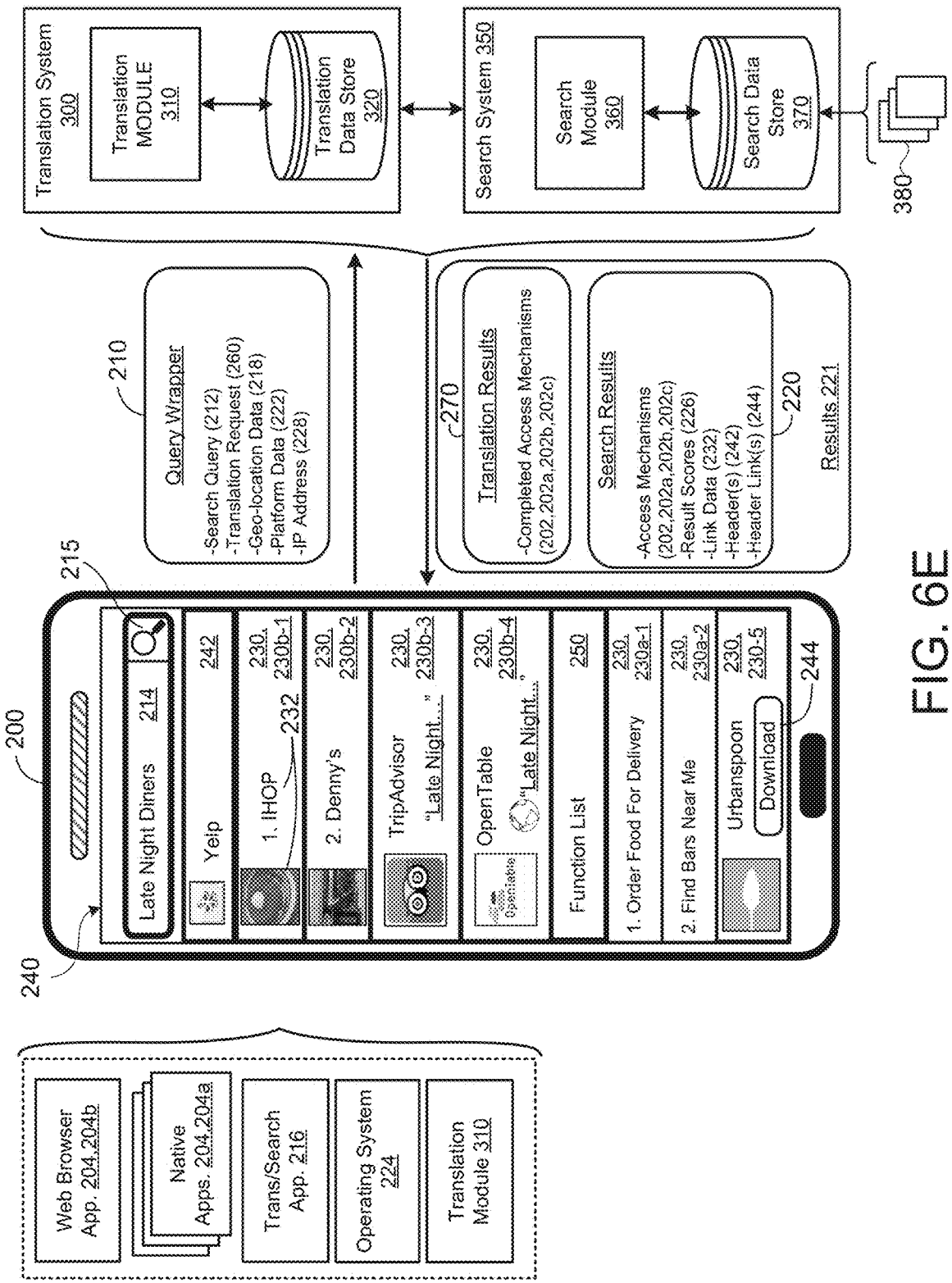
FIG. 6E is a schematic view of an example user device in communication with a translation system and a search system.
Figure 6F:
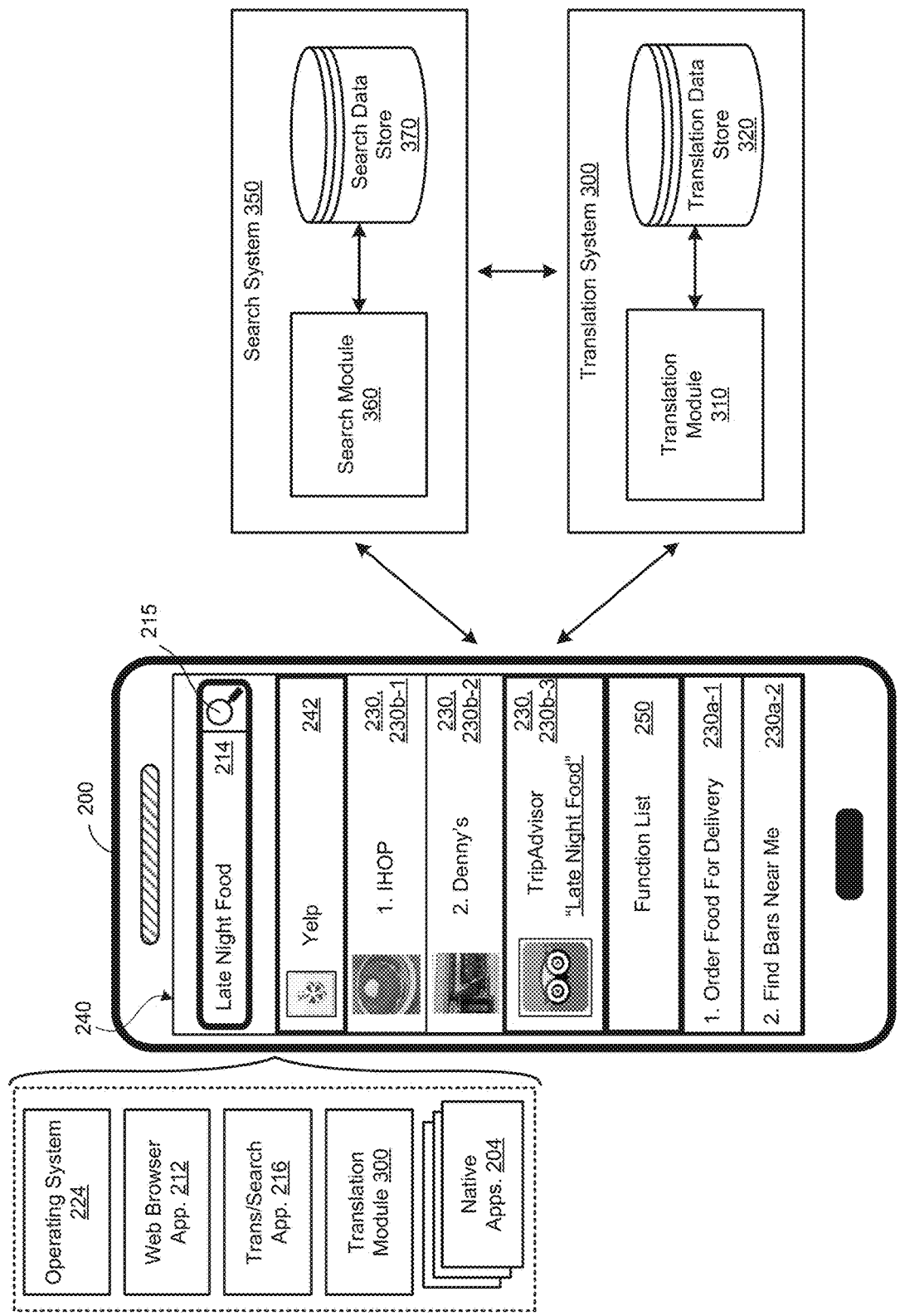
FIG. 6F is a schematic view of an example user device in communication with a translation system and a search system.

FIG. 1C illustrates an example user device 200 in communication with the translation system 300. FIGS. 6E and 6F illustrate an example user device 200 in communication with a search system 350 and a translation system 300. The user device 200 may communicate with the translation system 300 and optionally with the search system 350 using any software application 204 that can transmit search queries 212 to the translation system 300 and/or the search system 350. In some examples, the user device 200 runs a native application 204a that is dedicated to interfacing with the translation system 300 and optionally the search system 350, such as a native application 204a dedicated to performing searches and/or translations (e.g., a search and/or translation application 216). In some examples, the user device 200 communicates with the translation system 300 and optionally the search system 350 using a more general application 204, such as a web-browser application 204b. Although the user device 200 may communicate with the translation system 300 and optionally the search system 350 using the native search and/or translation application 216 and/or a web browser application 204b, the user device may be described herein as using the native search and/or translation application 216 to communicate with the translation system 300 and optionally the search system 350. In some implementations, the functionality attributed to the search and/or translation application 216 may be included as a searching and/or translation component of a larger application 204 that has additional functionality. For example, the functionality attributed to the search and/or translation application 216 may be included as part of a native application 204a or web application 204b as a feature that provides search and/or translation capabilities.

The search system 350 includes a search module 360 in communication with a search data store 370. The search data store 370 may include one or more databases, indices (E.g., inverted indices), tables, files, or other data structures, which may be used to implement the techniques of the present disclosure. The search module 360 receives a query wrapper 210 and generates search results 220 based on the data included in the data store 370. In some implementations, the search module 360 receives a query wrapper 210 from the user device 200 and performs a search for application state records 380 included in the search data store 370 based on data included in the query wrapper 210, such as a search query 212. The application state records 380 include one or more access mechanisms 202 that the user device 200 can use to access different functions for a variety of different applications, such as native applications 204a installed on the user device 200. The search module 360 transmits search results 220 including a list of access mechanisms 202 to the user device 200 that generated the query wrapper 210.

As shown in FIG. 6E, in some examples, a user 10 enters a search query 212, such as "late night diners" into a search field 214. The translation module 310 and the search module 360 simultaneously perform searches in their respective databases, i.e., the translation data store 320 and the search data store 370, and return both search results 220 and translation results 270. The translation results 270 are presented to the user as user-selectable links under a macro header 250 and the search results 220 are displayed and grouped based on a scoring mechanism (see FIG. 9A). In this way, the environment 100 allows the user 10 to input the search query 212 into a search field 214, and the environment 100 (via a GUI 240) provides the user 10 with results 221 that include both search results 220 and translation results 270. The translation results 270 represent macros that perform application-independent functions that may resolve the search query 212 or provide a user 10 with the functionality the user 10 desires. In some implementations, the translation system 300 may rank the translation results 270 using scores that indicate the percentage of matching terms and key words in the translation request 260 and translation records 330. In some implementations, the translation system 300 and/or the search system 350 may rank the translation results 270 by generating scores in the manner described below with respect to result scores and the search system 350.

In some implementations, the search system 350 transmits additional data in the results 221 along with the application access mechanisms 202a. For example, the search system 350 may transmit data (e.g., link data, such as text and/or images), which may be used by the user device 200 to generate user-selectable links 230 in the search results 220. A link 230 may include text and/or images that the user 10 may select (e.g., touch) via a user interface 240 displayed on a screen 201 (e.g., a display or touch screen) of the user device 200. Each user selectable link 230 may be associated with an application access mechanism 202a such that when the user 10 selects a link 230, the user device 200 launches the native application 204a referenced in the application access mechanism 202a and performs the one or more operations indicated in the application access mechanism 202a. The text and/or images of a link 230 displayed to the user 10 may indicate the operations that may be performed in response to selection of the link 230. For example, if the link 230 is to a song in a music playing application, the text and/or images may identify the music application that will be launched by the user device 200 and the song that will be played by the music playing application when the user 10 selects the link 230.

The user device 200 generates user-selectable links 230 based on the received translation results 270 (e.g., links 230a-1, 230a-2, etc.) and the search results 220 (e.g., links 230b-1, 230b-2, etc.). Each user-selectable link 230 displayed to the user 10 may include an access mechanism 202. The user 10 may select a user-selectable link 230 on the user device by interacting with the link 230 (e.g., by touching or clicking the link). In response to selection of a link 230, the user device 200 may launch a corresponding software application 204 (e.g., a native application 204a or a web-browser application 204b) referenced by the access mechanism 202 and perform one or more operations indicated in the access mechanism 202.

Figure 9:
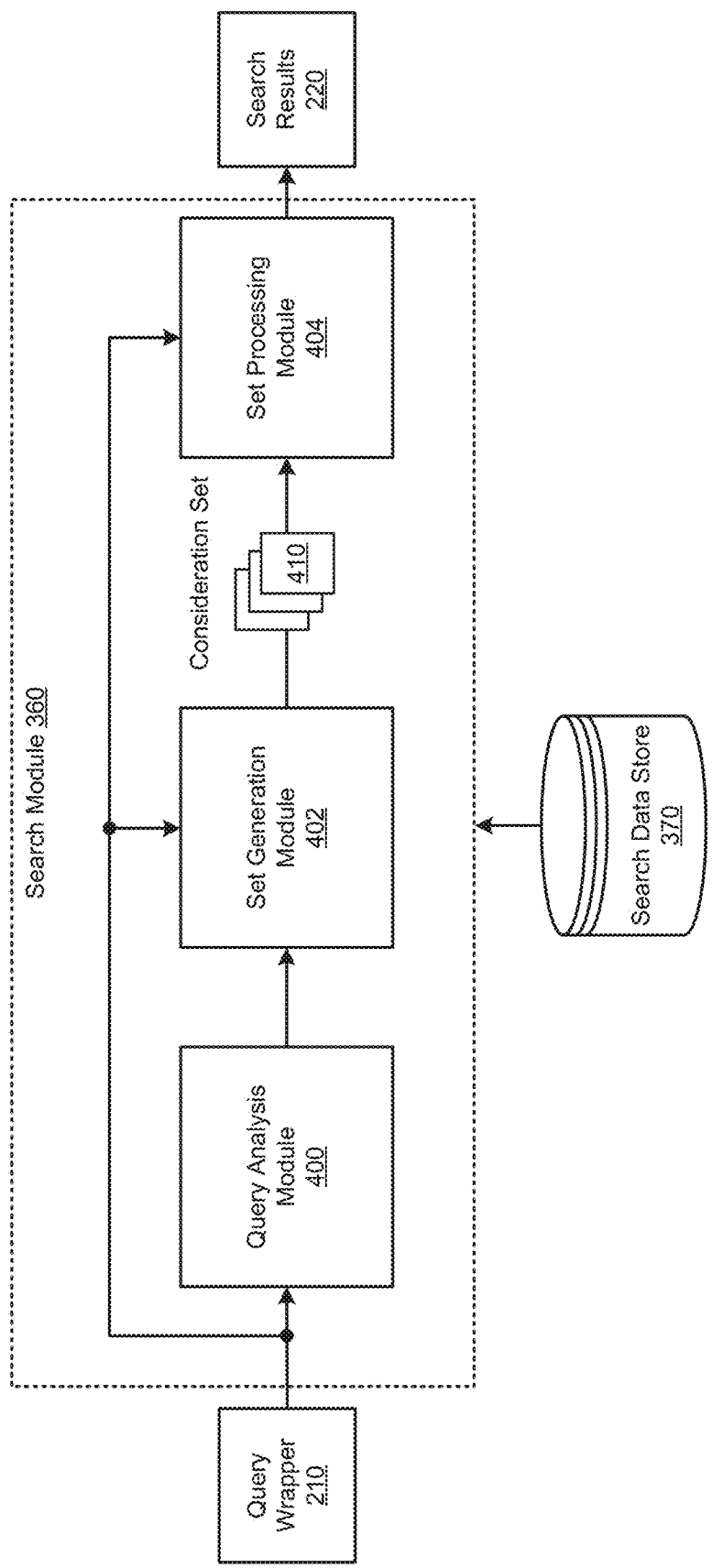
FIG. 9 is a schematic view of an example search module receiving and processing a query wrapper and outputting search results.

FIG. 9A illustrates an example search module 360. The search module 360 is configured to receive a query wrapper 210 from the user device 200 via the network 120. A query wrapper 210 may include a search query 212, which may include text, numbers, and/or symbols (e.g., punctuation) entered into the user device 200 by the user 10. For example, the user 10 may enter the search query 212 into a search field 214 (e.g., a search box) of a GUI 240 of a translation and/or search application 216 running on the user device 200. A user 10 may enter a search query 212 using a touchscreen keypad, a mechanical keypad, a speech-to-text program, or any other suitable form of user input. In general, a search query 212 may be a request for information retrieval (e.g., search results) from the search system 350. For example, a search query 212 may be directed to retrieving a list of links 230 to application functionality may indicate a user's desire to access functionality of one or more applications described by the search query.

The query wrapper 210 may include additional data along with the search query 212. For example, the query wrapper 210 may include geo-location data 218 and an IP address 228. In some examples, the query wrapper 210 may also include additional data, including, but not limited to, platform data 222 (e.g., a version of the operating system 224, a device type, and a web-browser version), an identity of a user 10 of the user device (e.g., a username), partner-specific data, and any other suitable data.

As shown in FIG. 6E, the search module 360 can receive a query wrapper 210 that includes a search query 212 and a translation request 260. In some implementations, a search query 212 may be sent to the translation system 300 as a translation request 260. In other words, as shown in example FIG. 6E, the user-input text "late night diners" acts as a search query 212 for the search system 350 and as a translation request 260 for the translation system 300. In other implementations, a translation request 260 may be sent to the search system 350 as a search query 212. In this way, the environment 100 can leverage both the translation system 300 and the search system 350 to identify applications and application-independent functions that satisfy a user's 10 search query 212 and/or translation request 260.

The environment 100 can transmit the search query 212 and the translation request 260 to the search system 350 and translation system 300, respectively. The search system 350 can execute a search of the data store 370 and the translation system 300 can perform a translation using the translation data store 320. The translation system 300 and the search system 350 return results 221 that include the search results 220 (header 242 and links 230b-1 . . . 230b-4) and the translation results 270 (header 250 and the user-selectable links to application-specific functions 230a-1 and 230a-2).

The search module 360 can use the search query 212 and the additional data included in the query wrapper 210 to generate search results 220. For example, the search module 360 can determine a geo-location of the user device 200, which the search module 360 can use along with the search query 212 to generate the search results 220. The search module 360 can determine the geo-location of the user device 200 based on the geo-location data 218 or other data (e.g., an IP address 228) included in the query wrapper 210. In some implementations, the search module 360 can detect a location (e.g., a postal address, street name, city name, etc.) specified in the search query 212 (i.e., a location indicated by the search query). In these implementations, the search module 360 can use the query-specified location along with the search query 212 to generate the search results 220.

The search module 360 can perform a search for application state records 380 included in the search data store 370 in response to the received query wrapper 210 (e.g., in response to the search query 212 and the geo-location data 218). In some implementations, the search module 360 generates result scores 226 for application state records 380 identified during the search. The result score 226 associated with an application state record 380 may indicate the relevance of the application state record 380 to the search query 212. A higher result score 226 may indicate that the application state record 380 is more relevant to the search query 212. The search module 360 may retrieve access mechanisms 202 from the scored application state records 380. The search module 360 can transmit a result score 226 along with an access mechanism 202 retrieved from a scored application state record 380 in order to indicate the rank of the access mechanism 202 among other transmitted access mechanisms 202.

Returning to FIGS. 6A-6F, the user device 200 may receive a set of results 221 from one or both of the translation module 310 and the search module 360 in response to transmission of the translation request 260 and/or the query wrapper 210 to the translation system 300 and the search system 350. FIG. 1C illustrates the user device 200 receiving translation results 270. FIG. 6D illustrates the user device 200 receiving results 221 that include both search results 220 and translation results 270. The GUI 240 of the translation and/or search application 216 renders and displays the results 221 received from the translation module 310 and/or the search module 360. The translation and/or search application 216 may display the results 221 to the user 10 in a variety of different ways, depending on the information transmitted to the user device 200. In examples where the search results 220 include a list of access mechanisms 202 and link data associated with the access mechanisms 202, the translation and/or search application 216 may display the results 221 (i.e., the search results 220 and the translation results 270) to a user 10 of the user device 200 as a list of user-selectable links 230 including text and images. The text and images in the links 230 may include application names associated with the access mechanisms 202, text describing the access mechanisms 202, images associated with the application 204 referenced by the access mechanisms 202 (e.g., application icons), and images associated with the application state (e.g., application screen images) defined by the access mechanisms 202.

In some implementations, the translation and/or search application 216 displays the results 221 as a list of user-selectable links 230 arranged under the search field 214 in which the user 10 entered the translation request 260 and/or search query 212. Moreover, the translation and/or search application 216 may arrange the user-selectable links 230 in an order based on result scores 226 associated with the access mechanisms 202 included in the links 230. In some examples, the translation and/or search application 216 groups the macro list 251 under a macro list header 250 that includes the links 230a associated with one or more application-independent functions. In some examples, the translation and/or search application 216 groups the links 230 together if the links 230 are related to the same application 204 (e.g., a native application 204a).

With respect to FIGS. 6A-6C, it may be assumed that the native application 204a for YELP® developed by Yelp, Inc., and the native application 204a for TRIPADVISOR® developed by TripAdvisor, Inc., are installed on the user device 200. The links 230b respectively reference the YELP® and TRIPADVISOR® native applications 204a. The GUI 240 includes a header 242, including the name "Yelp," under which the links 230b-1, 230b-2, 230b-3 are arranged, thereby indicating that selection of the links under the header 242 will cause the user device 200 to launch the YELP® native application 204a and set the YELP® native application 204a to a state corresponding to the user-selectable link 230b selected by the user. For example, if a user 10 of the user device 200 selects the IHOP® link 230b-1, the user device 200 may launch the YELP® native application 204a and set the YELP® application to a restaurant review of IHOP®.

In some examples, the GUI 240 can include a macro header 250, indicating application-independent functions corresponding to a translation request 260 and/or search query 212 (e.g., the string "late night diners"). The application-independent functions appearing under the macro header 250 may include macros previously generated by a user (e.g., application-independent functions completed with pre-determined, user-generated values) and/or application-independent functions that a user 10 and/or the translation module 310 may complete after the user 10 selects the user-selectable link 230a. For example, in the case of a user-selectable link 230 corresponding to an application-independent function that does not correspond to a previously generated macro, selection of a user-selectable link 230a may cause the user device 200 to launch a pop-up window allowing the user 10 to select between one or more different application-specific functions (i.e., specific application states capable of performing the application-independent function).

For example, the translation module 310 may interpret the string "late night diners" as corresponding to an application-independent function that enables a user to order pizza. In this example, the translation module 310 may include the application-independent function "Order Food" in the translation results 270. The translation module 310 may select the application-independent function "Order Food" based on a relative result score that the translation module 310 generated for translation records 330 matching to the translation request 260 and/or search query 212 (i.e., the string "late night diners"). For example, the result scores may be generated by the translation module by matching key words and/or terms of the search query with the searchable translation information 334 of the translation records 330. Additionally or alternatively, the translation module may utilize any scoring method (such as the scoring method utilized by the search system 350, discussed in detail below) to determine which translation records 330 (and therefore application-independent function) to select based on a given translation request 260 and/or search query 212. A translation record 330 selected by the translation module 310 to satisfy the translation request 260 for "late night diners" may be the translation record 330 for the application-independent function "Order Food" which can include one or more parameters such as "(cuisine type)" (see, e.g., Table 1).

In some examples, the translation module 310 may use information provided by the translation request 260, such as the substring "late night", to select parameters for the application-independent function "Order Food". In these scenarios, the substring "late night" may result in the translation module 310 selecting the value "pizza" to satisfy the parameter "(cuisine type)". As such, upon selection of the user-selectable link 230a-2 entitled "Order Pizza," the user device 200 may display a pop-up window providing application-specific functions that can accomplish the application-independent function "Order(pizza)." For example, the pop-up window may include a user-selectable link that, when selected by the user 10 of the user device 200, instructs the user device 200 to make a phone call to the nearest pizza restaurant. Continuing this example, the pop-up window may additionally include a user-selectable link that instructs the user device 200 to open an application to a state that allows the user to order a pizza via the Internet (e.g., the PIZZAHUT® application, developed by Pizza Hut, Inc.). In some cases, the translation module 310 may not identify parameters in the translation request 260. In these cases, the user device 200 may generate additional pop-up windows that allow a user to select or input parameters for the application-independent function. For example, instead of providing a user-selectable link that performs the application-independent function "Order Pizza", the translation module 310 may instead provide a user-selectable link entitled "Order Food." In this example, the user device 200 may provide several pop-up windows that allow a user 10 to select or input values for one or more of the parameters associated with the application-independent function "Order Food".

If the user-selectable link 230a selected by the user corresponds to a macro previously generated by the user 10, the user device 200 may instead launch to one or more application states according to previously-specified parameters indicated by the macro. For example, the user-selectable link 230a-1 of FIG. 2A entitled "Drive home" may be a macro named and generated by the user according to the techniques described herein. In this example, upon selection of the user-selectable link 230a-1, the user device 200 may open an application to an application state that navigates a user 10 of the user device 200 from their current location to their home address. In this example, the user 10 has previously defined the macro "Drive home" to invoke the "NavigateO" function completed with the user's 10 current address and home address as values for the parameters "(destination location)" and "(departure location)," respectively. In this example, the user 10 may have additionally selected a default application to perform the "Drive home" macro, which causes the user device 200 to launch a previously-specified default application. In examples where the user 10 has not specified a default application, the user device 200 may allow the user to select between applications available on the user device 200 that can also perform the functions indicated by the macro. In the event that there are no applications installed on the user device 200 that are capable of performing the one or more application-independent functions indicated by the macro, the translation module 310 may provide the user device 200 with download access mechanisms that allow the user 10 to download an application capable of performing the application-independent function.

In some examples, user devices 200 communicate with the translation system 300 and/or the search system via a partner computing system (not illustrated). The partner computing system may be a computing system of a third party that may leverage the search functionality of the search system 350. The partner computing system may belong to a company or organization other than that which operates the translation system 300 and/or the search system 350. Example third parties, which may leverage the functionality of the translation system 300 and/or the search system 350 may include, but are not limited to, internet search providers and wireless communications service providers. The user devices may send search queries 212 and translation requests 260 to the translation system 300 and/or the search system 350 and receive search results 220 and/or translation results 270 via the partner computing system. The partner computing system may provide a user interface to the user devices 200 in some examples and/or modify the search experience provided on the user devices 200.

FIGS. 1B, 6B, and 6D show a plurality of data sources 130. The data sources 130 may be sources of data, which the translation system 300 (e.g., the translation module 310) may use to generate and update the contents of the translation data store 320. The search system 350 (e.g., the search module 360) may also use the data sources 130 to generate and update the contents of the search data store 370. The data retrieved from the data sources 130 can include any type of data related to application functionality and/or application states. Data retrieved from the data sources 130 may be used to create and/or update one or more databases, indices, tables (e.g., an access table), files, or other data structures included in the translation data store 320 and the search data store 370. For example, translation records 330 and application state records 380 may be created and updated based on data retrieved from the data sources 130. In some examples, some data included in a data source 130 may be manually generated by a human operator. Data included in translation records 330 and application state records 380 may be updated over time so that the translation system 300 and the search system 350 provide up-to-date results. In some examples, data may be shared between the translation data store 320 and the search data store 370.

The data sources 130 may include a variety of different providers. The data sources 130 may include data from application developers 130a, such as application developers' websites and data feeds provided by developers. The data sources 130 may include operators of digital distribution platforms 130b configured to distribute native applications 204a to user devices 200. Example digital distribution platforms 130b include, but are not limited to, the GOOGLE PLAY® digital distribution platform by Google, Inc. and the APP STORE® digital distribution platform by Apple, Inc.

The data sources 130 may also include other websites, such as websites that include web logs 130c (i.e., blogs), application review websites 130d, or other websites including data related to applications. Additionally, the data sources 130 may include social networking sites 130e, such as "FACEBOOK®" by Facebook, Inc. (e.g., Facebook posts) and "TWITTER®" by Twitter Inc. (e.g., text from tweets). Data sources 130 may also include online databases 130f that include, but are not limited to, data related to movies, television programs, music, and restaurants. Data sources 130 may also include additional types of data sources in addition to the data sources described above. Different data sources 130 may have their own content and update rate.

Figures 7A, 7B:
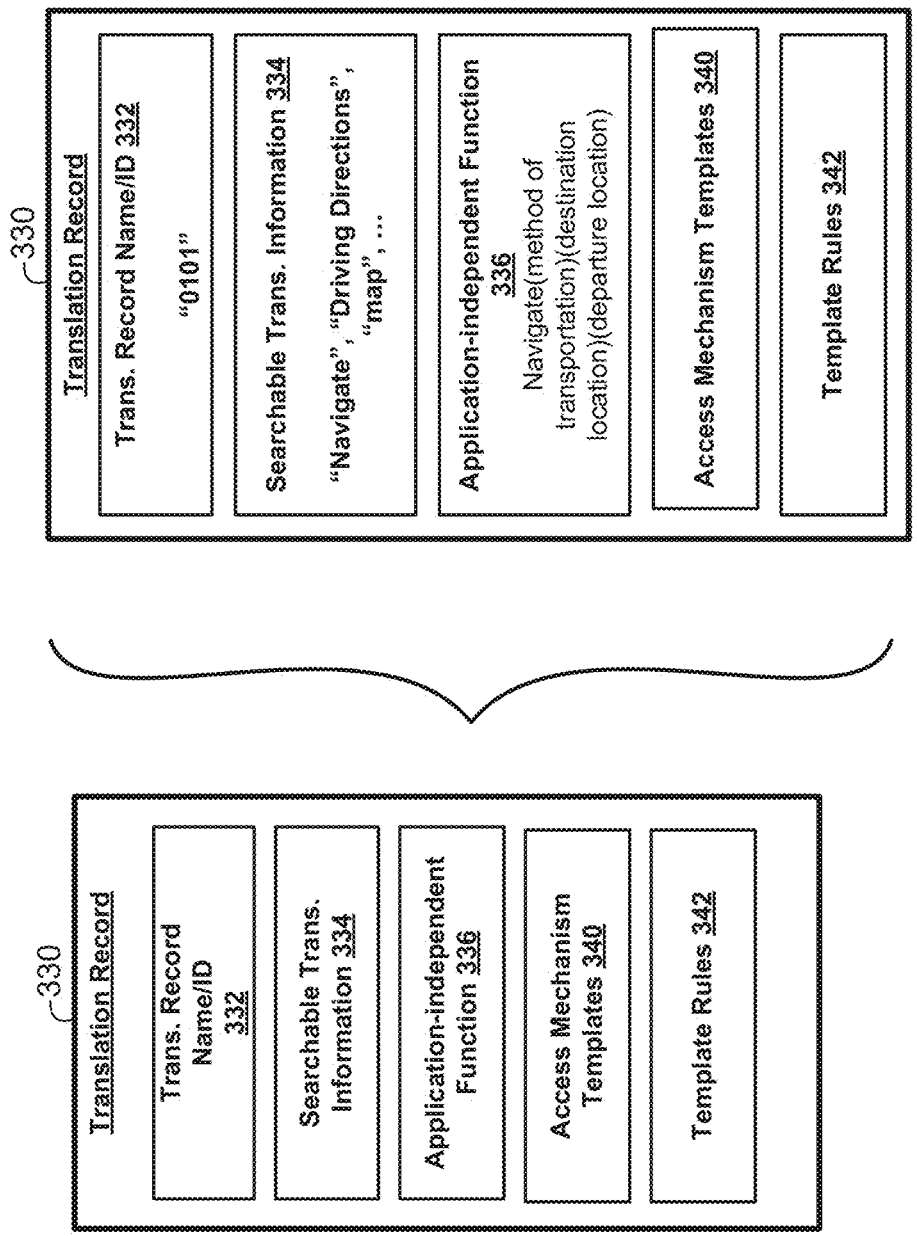
FIGS. 7A and 7B are schematic views of example translation records.

FIGS. 7A and 7B illustrate an example translation record 330. In some implementations, the environment 100 includes both a translation system 300 and a search system 350. In these implementations, each translation record 330 may include searchable translation information 334 that may be accessed by both the translation system 300 and the search system 350. In this way, each translation record 330 may include data related to an application-independent function and/or the state of one or more applications that result from the performance of their respective application-specific function.

A translation record ID 332 may be used to identify a translation record 330 among other translation records 330. The translation record ID 332 may be a string of alphabetic, numeric, and/or symbolic characters (e.g., punctuation marks) that uniquely identifies an associated translation record 330. For example, in the example provided by FIG. 7B, a translation record 330 with the translation record ID 332 "0101" may correspond to the application-independent function 336 "Navigate" and the parameters "(method of transportation)(destination location)(departure location)". The translation record ID 332 may additionally correspond to macros created by a user 10 (see FIGS. 5A-5C). For example, a user device 200 may maintain relationships (e.g., via a lookup table) between a macro stored on the user device 200 and the translation record ID(s) 332 utilized by the macroinstruction. In this way, the user device 200 may transmit one or more translation record IDs 332 corresponding to a macro to the translation system 300 to assist in the translation process.

Searchable translation information 334 includes data that corresponds to the application-independent function and may be referenced by the search queries 212 and/or translation requests 260. Searchable translation information may include text, numbers, symbols, or any other information that describes an application state. In this way, the translation module can perform keyword text matching between the information provided in a translation request 260 and the searchable translation information 334. The type of data included in searchable translation information 334 may depend on the type of information associated with the application states of the translation record 330 and their corresponding access mechanisms 202. For example, searchable translation information 334 may include a variety of different types of data such as structured, semi-structured, and/or unstructured data. Searchable translation information 334 may be automatically and/or manually generated based on documents retrieved from the data sources 130.

FIGS. 7C and 7D illustrate an example application state record that may be included in a plurality of different application state records 380 stored in the search data store 370. Each application state record 380 may include data related to a function of an application 204 and/or the state of the application 204 resulting from performance of a function. An application state record 380 may include an application state identifier (ID) 382, application state information 384, an application identifier (ID) 386, and one or more access mechanisms 202 that may be used to access functionality provided by the application associated with the application record 380.

The application state ID 382 may be used to identify the application state record 380 among other application state records 380 included in the search data store 370. The application state ID 382 may be a string of alphabetic, numeric, and/or symbolic characters (e.g., punctuation marks) that uniquely identifies the associated application state record 380. In some examples, the application state ID 382 can describe a function and/or an application state in human readable form. For example, an application state ID 382 may include the name of the application 204 referenced in the access mechanism(s) 202 of the application state record 380. For example, as depicted by FIG. 7D, the application state ID 382 for a state of the OPENTABLE® application that provides a review of the restaurant "The French Laundry" may be the string "Opentable—The French Laundry". Additionally or alternatively, the application state ID 382 may include a string in the format of a uniform resource locator (URL) of a web access mechanism 202b for the application state associated with the application state record 380.

Application state information 384 may include data that describes an application state. For example, application state information 384 may include data that describe the function performed according to the one or more access mechanisms 202 included in the application state record 380. Application state information 384 can include text, numbers, symbols, or any combination thereof. The type of data included in application state information 384 may depend on the function accomplished by accessing the application state corresponding to the application state record 380 according to one or more access mechanisms 202. Application state information 384 may include a variety of different types of data, such as structured, semi-structured, and/or unstructured data. Application state information 384 may be automatically and/or manually generated based on documents retrieved from the data sources 130.

In some examples, application state information 384 includes data that may be presented to a user 10 by an application 204 when the application 204 is set to an application state defined by an access mechanism 202. For example, if an application state record 380 is associated with a shopping application, the application state information 384 may include data that describes products (e.g., names and prices) that are shown when the shopping application is set to the application state defined by the access mechanism 202. As another example, if the application state record 380 is associated with a music player application, the application state information 384 may include data that describes a song (e.g., song name and artist) that is played when the music player application is set to the application state defined by the access mechanism 202.

The search system 350 may generate application state information 384 included in an application state record 380 in a variety of different ways. In some examples, the search system 350 retrieves data to be included in the application state information 384 via partnerships with database owners and developers of native applications 204a. For example, the search system 350 may automatically retrieve data from online bases 130f that include, but are not limited to, data related to movies, television programs, music, and restaurants. In some examples, a human operator can manually generate some data included in the application state information 384.

Application state information 384 may additionally describe the native application 204a, instead of any particular application state. For example, the application state information 384 may include the name of the developer of the application 204, the publisher of the application 204, a category 385a (e.g., genre) of the application 204, a description 385b of the application 204 (e.g., a developer's description), and the price of the application 204. The application state information 384 may also include security or privacy data about the application 204, battery usage of the application 204, and bandwidth usage of the application 204. The application state information 384 may also include application statistics. Application statistics may refer to numerical data related to a native application 204a. For example, application statistics may include, but are not limited to, a number of downloads, a download rate (e.g., downloads per month), a number of ratings, and a number of reviews.

FIG. 7D shows an example application state record 380 associated with the OPENTABLE® application, developed by OpenTable, Inc. The OPENTABLE® application is a restaurant-reservation application that allows users to search for restaurants and make restaurant reservations. The OPENTABLE®application provides information about restaurants including descriptions of restaurants and user reviews of the restaurants. The example application state record 380 of FIG. 7B describes an application state of the OPENTABLE® application in which the OPENTABLE® application accesses information for THE FRENCH LAUNDRY® restaurant.

The example application state record 380 includes an application state ID 382 of "OPENTABLE—THE FRENCH LAUNDRY," which may be used as a unique identifier to identify the application state record 380. In other examples, the application state ID 382 could include a URL as a unique identifier for the application state record 380. For example, the application state ID 382 may include the string "http://www.opentable.com/the-french-laundry" as a unique identifier for the application state record 380. As another example, the application state ID 382 may have a different namespace than "http://," such as "func://." In yet another example, the application state ID 382 could be a string of characters, numbers, and/or symbols that are not in human readable form. Each example is optional and may be combined with other examples.

The example application state information 384 includes data fields 385, such as a category 385a of THE FRENCH LAUNDRY® restaurant, a description 385b of THE FRENCH LAUNDRY® restaurant, user reviews 385c of THE FRENCH LAUNDRY® restaurant, and additional data fields 385. The restaurant category 385a field may include the text "French cuisine" and "contemporary," for example. The description field 385b may include text that describes THE FRENCH LAUNDRY® restaurant. The user reviews field 385c may include text of user reviews for THE FRENCH LAUNDRY® restaurant. The additional data fields 385 may include additional data for THE FRENCH LAUNDRY® restaurant that may not specifically fit within the other defined fields, such as a menu for the restaurant, prices, and operating hours for the restaurant.

The application state record 380 includes one or more access mechanism(s) 202. The access mechanism(s) 202 may include a reference to the OPENTABLE® application 204. An example application access mechanism 202a for the application state record 380 may include a reference to the OPENTABLE® native application 204a along with one or more operations to be performed by the user device 200. For example, the application access mechanism 202a may include an application resource identifier and/or one or more operations that cause the user device 200 to access the entry for THE FRENCH LAUNDRY® restaurant in the OPENTABLE® native application. An example application resource identifier may be "vnd.opentable.deeplink://opentable.com/restaurant/profile?rid=1180&refid=1."

In some implementations, an application state record 380 includes multiple different application access mechanisms 202, 202a, 202b, 202c that may include a variety of information. Each application access mechanism 202 may include edition information that indicates the application edition with which the application access mechanism 202 is compatible. For example, the edition information may indicate the operating system 224 with which the application access mechanism 202 is compatible. Moreover, different application access mechanisms 202 may be associated with different editions of a native application 204a. A native application edition refers to a particular implementation or variation of a native application 204a. For example, an application edition may refer to a version of a native application 204a, such as a version 1.0 of a native application 204a or a version 2.0 of a native application 204a. In another example, an application edition may refer to an implementation of a native application 204a for a specific platform, such as a specific operating system 224.

The different application access mechanisms 202 included in an application state record 380 may cause the corresponding application editions to launch and perform similar functions. Accordingly, the different application access mechanisms 202 included in an application state record 380 may cause the corresponding application editions to be set into similar application states. For example, if the different application access mechanisms 202 reference different editions of an information retrieval application, the different application access mechanisms 202 may cause the corresponding application editions to retrieve similar information. In another example, if the different application access mechanisms 202 reference different editions of an internet music player application, the different application access mechanisms 202 may cause the corresponding application editions to play the same song.

In some examples, an application state record 380 for a native application that retrieves restaurant information may include multiple different application access mechanisms 202 for multiple different application editions. Assuming the application state record 380 is associated with a specific Mexican restaurant, the application access mechanisms 202 for the different application editions may cause each application edition to retrieve information for the same specific Mexican restaurant. For example, a first application access mechanism 202 may cause a first application edition (e.g., on a first OS) to retrieve information for the specific Mexican restaurant. A second application access mechanism 202 may cause a second application edition (e.g., on a second OS) to retrieve information for the specific Mexican restaurant. In some examples, the search system 350 can determine whether to transmit the application access mechanism 202 in the search results 220 based on whether the user device 200 can handle the application access mechanism 202.

Figure 8A:
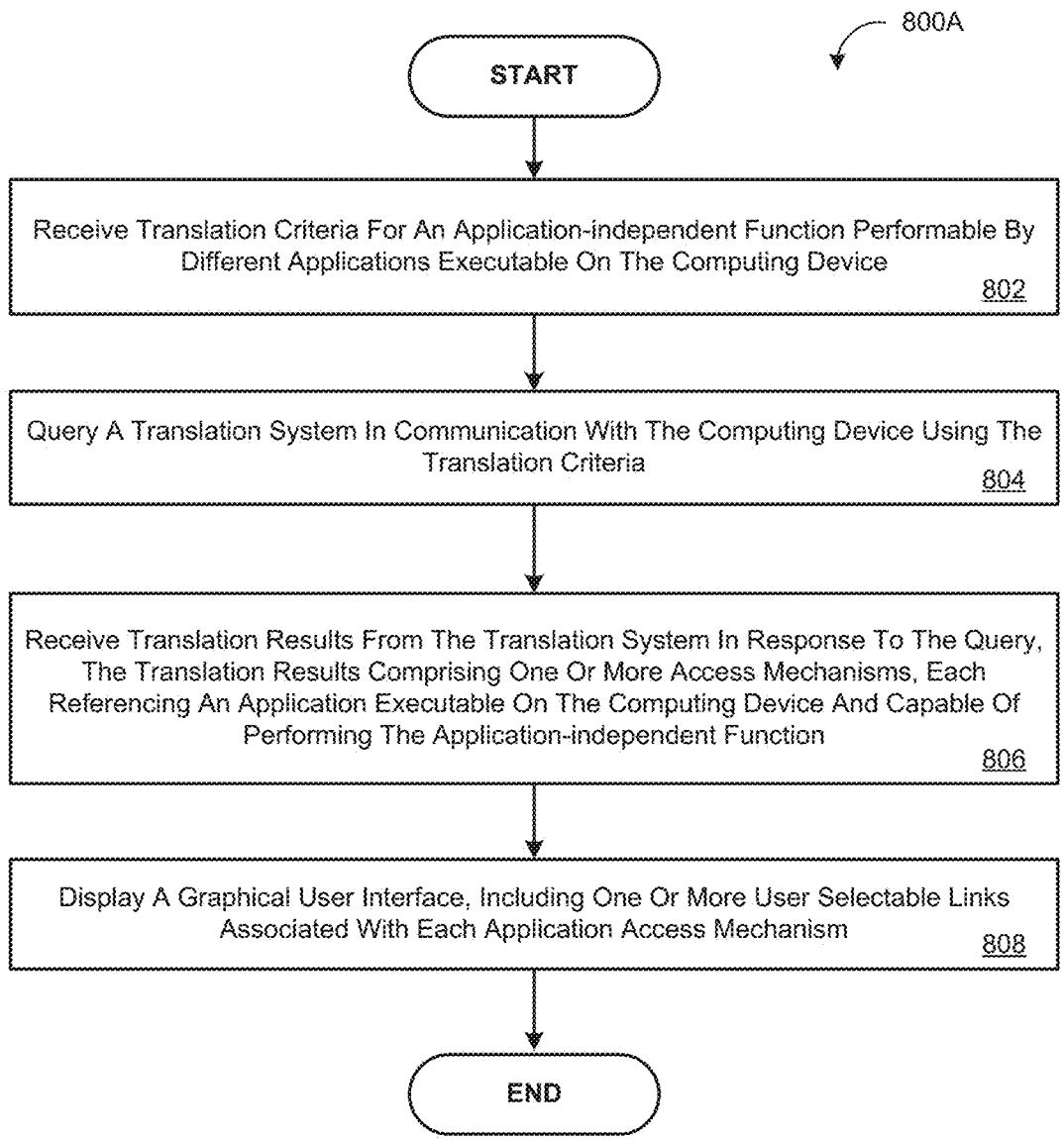
FIG. 8A is a flow diagram illustrating an example method of operating a user device.

FIG. 8A illustrates a method 800A for performing a translation of an application-independent function 336 to one or more application-specific functions at a user device 200. At block 802, the method 800A includes receiving (e.g., via user input), at the user device 200, a translation request 260 corresponding to an application-independent function 336 performable by different applications 204 executable on the user device 200. At block 804, the method 800A includes transmitting the received translation request 260 to a translation system 300 in communication with the user device 200. At block 806, the method 800A includes receiving, at the user device 200, translation results 270 from the translation system 300 (e.g., the translation module 310). At block 808, the method 800A includes displaying, on a display 201 associated with the user device 200, a graphical user interface 240 including one or more user selectable links 230a associated with the one or more application access mechanisms 202 of the translation results 270. The translation results 270 include one or more access mechanisms 202, each referencing an application 204 executable on the user device 200 and capable of performing the application-independent function 336.

In some implementations, the method 800A includes receiving, at the user device 200, a user selection of a user-selectable link 230a and executing, at the user device 200, the application access mechanism 202 associated with the selected user-selectable link 230a. The translation request 260 may include parameter values for the application-independent function 336. Additionally or alternatively, each access mechanism 202 may indicate a performable operation configured by the parameter values for the corresponding application 204.

Figure 8B:
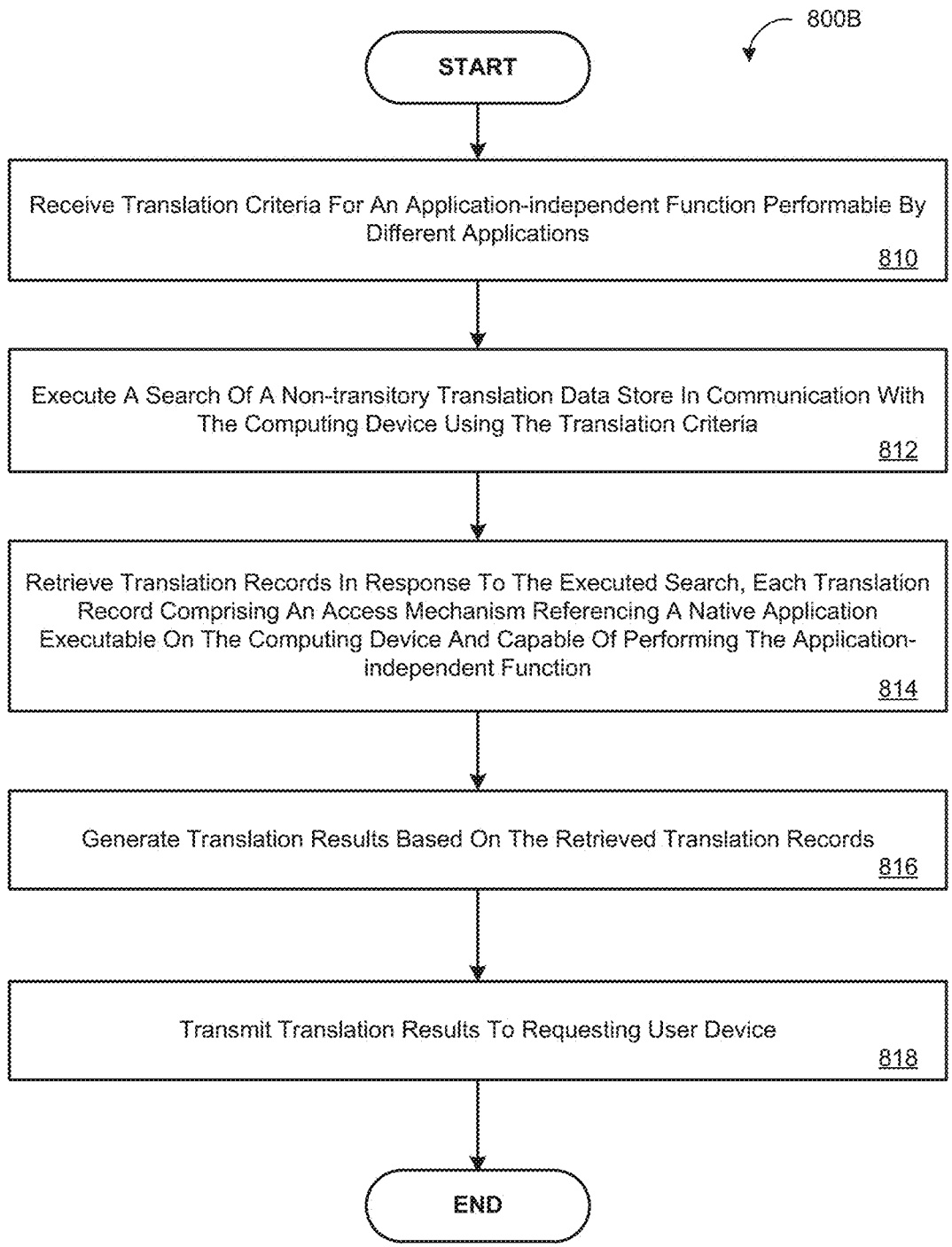
FIG. 8B is a flow diagram illustrating an example method of operating a translation module.

FIG. 8B illustrates a method 800B for performing a translation of an application-independent function 336 to one or more application-specific functions at a translation system 300. At block 810, the method 800B includes receiving, at a computing device 112 from a user device 200, a translation request 260 corresponding to an application-independent function 336 performable by different applications 204. At block 812, the method 800B further includes executing, using the computing device 112, a search of a non-transitory translation data store 320 in communication with the computing device 112 using the translation request 260. At block 814, the method 800B includes retrieving, by the computing device 112 from the translation data store 320, translation records 330 in response to the executed search. At block 816, the method 800B includes generating translation results 270 based on the retrieved one or more translation records 330, each individual translation result 270 associated with an individual translation record 330 and thereby including one or more access mechanisms 202 referencing a native application 204a executable on the requesting user device 200 and capable of performing the application-independent function 336. At block 818, the method 800B further includes transmitting the generated translation results 270 to the requesting user device 200.

Figure 8C:
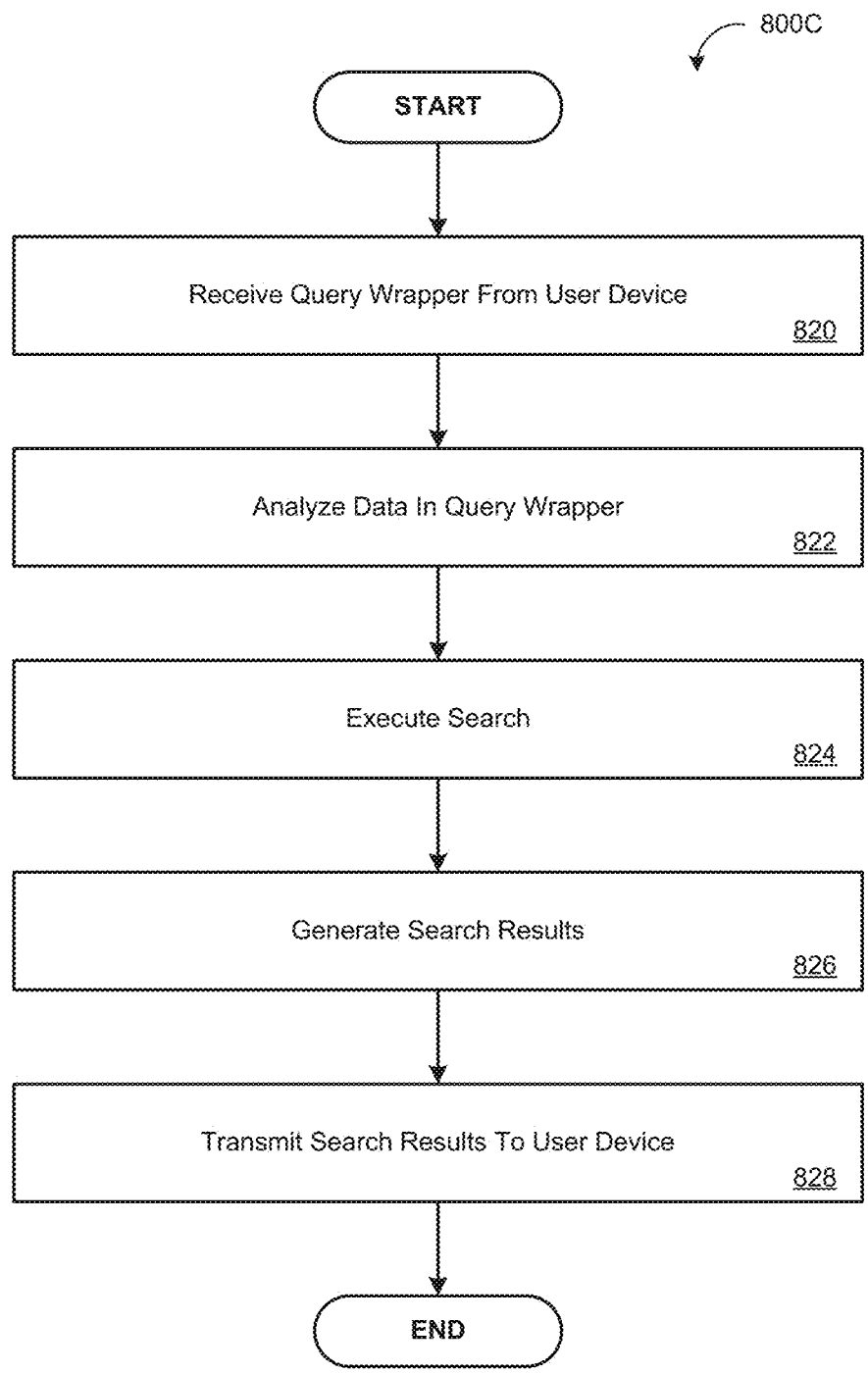
FIG. 8C is a flow diagram illustrating an example method of operating a search module.

FIG. 8C provides an example arrangement of operations for a method 800C of performing a search. The method 800C is described with respect to the user device 200, the translation system 300, the search module 360, and the search system 350 as illustrated in FIG. 6B. At block 820, the search module 360 receives a query wrapper 210. At block 822, the search module analyzes data (e.g., the search query 212) included in the query wrapper 210. For example, the query analysis module 400 (see FIGS. 9A-9C) analyzes the search query 212 (and/or other data) of the query wrapper 210. At block 824, the method 800C includes executing a search of the search data store 370 using the search module 360 and identifying application state records 380 based on the data of the query wrapper 210 (e.g., the search query 212). At block 826, the method 800C includes generating search results 220. The search system 350 (in particular, the search module 360) may generate the search results 220 based on a scoring of the application state records 380. At block 828, the method 800C includes transmitting the search results 220 to the user device 200. The search module 360 may deliver the search results 220, which can include access mechanisms 202, result scores 226, and/or link data. For example, the set processing module 404 transmits the search results 20 to the user device 200 that generated the search query 212.

FIG. 9A shows an example search module 360 that includes a query analysis module 400, a consideration set generation module 402 (hereinafter "set generation module 402"), and a consideration set processing module 404 (hereinafter "set processing module 404"). The query analysis module 400 receives the query wrapper 210 and analyzes the received query 212. The query analysis module 400 performs various analysis operations on the received search query 212, which may include, but are not limited to, tokenization, filtering, stemming, synonymization, and stop word removal. In some implementations, the query analysis module 400 detects a query-specified location included in the search query 212.

The set generation module 402 identifies a plurality of application state records 380 based on the received search query 212. In some examples, the set generation module 402 identifies the application state records 380 based on matches between terms of the search query 212 and terms in the application records 380. For example, the set generation module 402 may identify the application state records 380 based on matches between tokens generated by the query analysis module 400 and words included in the application state records 380, such as words included in the application state information 384.

The consideration set 410 of application state records 380 may refer to the application state records 380 that are to be scored by the set processing module 404. The set generation module 402 may determine the geo-location of the user device 200 based on data included in the query wrapper 210. In additional examples, if the query analysis module 400 detects a query-specified location, the set generation module may use the query-specified location as the search location. In some examples, the set generation module 402 uses the geo-location of the user device 200 as the search location (e.g., to filter application state records 380 based on location).

The set processing module 404 may score the application state records 380 in the consideration set 410 in order to generate a set of search results 220. The scores 226 associated with the application state records 380 may be referred to as "result scores." The set processing module 404 may determine a result score 226 for each of the application state records 380 in the consideration set 410. The result scores 226 associated with an application state record may indicate the relative rank of the application state record 380 among other application state records 380. For example, a larger result score may indicate that an application state record 380 is more relevant to the received search query 212 than application state records with lower result scores 226.

The set processing module 404 selects application access mechanisms from the application state records 380 (e.g., application state records 380 with the largest result scores 226). The set processing module 404 transmits the selected application access mechanisms 202 to the user device 200 that generated the search query 212. The set processing module 404 may also transmit the result scores 226 associated with the application access mechanisms 202. For example, an application access mechanism 202 may be associated with the result score 226 of the application state record 380 from which the application access mechanism 202 was selected.

The information conveyed by the search results 220 may depend on how the result scores 226 are calculated by the set processing module 404. For example, the result scores 226 may indicate the relevance of an application state to the search query 212, the popularity of an application state, or other properties of an application state, depending on what criteria the set processing module 404 uses to score the application state records 380.

The set processing module 404 may generate result scores 226 for application state records 380 in a variety of different ways. In some implementations, the set processing module 404 generates a result score 226 for an application state record 380 based on one or more scoring features. The scoring features may be associated with the application state record 380 and/or the search query 212. An application state record scoring feature (hereinafter "record scoring feature") may be based on any data associated with an application state record 380. For example, record scoring features may be based on any data included in the application state information 384 of the application state record 380. Example record scoring features may be based on metrics associated with a person, place, or thing described in the application state record 380. Example metrics may include the popularity of a place described in the application state record 380 and/or ratings (e.g., user ratings) of the place described in the application state record 380. For example, if the application state record 380 describes a song, a metric may be based on the popularity of the song described in the application state record 380 and/or ratings (e.g., user ratings) of the song described in the application state record 380. The record scoring features may also be based on measurements associated with the application state record 380, such as how often the application state record 380 is retrieved during a search and how often access mechanism(s) 202 of the application state record 380 are selected by a user 10. Record scoring features may also be based on whether the application state record 380 includes an application access mechanism 202 that leads to a default state or a deeper native application state.

A query scoring feature may include any data associated with the search query 212. For example, query scoring features may include, but are not limited to, a number of words in the search query 212, the popularity of the search query 212, and the expected frequency of the words in the search query 212. A record-query scoring feature may include any data generated based on data associated with both the application state record 380 and the search query 212 that resulted in identification of the application state record 380 by the set generation module 402. For example, record-query scoring features may include, but are not limited to, parameters that indicate how well the terms of the search query 212 match the terms of the application state information 384 of the identified application state record 380. The set processing module 404 may generate a result score 226 for an application state record 380 based on at least one of the record scoring features, the query scoring features, and the record-query scoring features.

The set processing module 404 may determine a result score 226 an application state record 380 based on one or more of the scoring features listed herein and/or additional scoring features not explicitly listed. In some examples, the set processing module 404 may include one or more machine learned models (e.g., a supervised learning model) configured to receive one or more scoring features. The one or more machine learned models may generate result scores 226 based on at least one of the record scoring features, the query scoring features, and the record-query scoring features. For example, the set processing module 404 may pair the search query 212 with each application state record 380 and calculate a vector of features for each (query, record) pair. The vector of features may include one or more record scoring features, one or more query scoring features, and one or more record-query scoring features. The set processing module 404 may then input the vector of features into a machine-learned regression model to calculate a result score for the application state record 380. In some examples, the machine-learned regression model may include a set of decision trees (e.g., gradient boosted decision trees). In another example, the machine-learned regression model may include a logistic probability formula. In some examples, the machine learned task can be framed as a semi-supervised learning task, where a minority of the training data is labeled with human curated scores and the rest are used without human labels.

The result scores 226 associated with the application state records 380 and access mechanism(s) 202 included therein may be used in a variety of different ways. The set processing module 404 and/or the user device 200 may rank the access mechanisms 202 based on the result scores 226 associated with the access mechanisms 202. In these examples, a larger result score may indicate that an access mechanism 202 corresponding to a particular application state is more relevant to a user than an access mechanism 202 having a smaller result score. In examples where the user device 200 displays the search results 220 as a list, the user device 200 may display the links 230 for access mechanisms 202 having larger result scores 226 nearer to the top of the results list (e.g., near to the top of the screen). In these examples, the user device 200 may display the links 230 for access mechanisms 202 having lower result scores 226 farther down the list (e.g., off screen). In some examples, as illustrated in FIG. 2, the user device 200 groups together the links 230 associated with the same native application 204*a*.

Modules and data stores included in the environment 100 represent features that may be included in the translation system 300 and the search system 350 of the present disclosure. The modules and data stores described herein may be embodied by electronic hardware, software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein may be realized by common electronic hardware and software components. In some implementations, the features associated with the one or more modules and data stores depicted herein may be realized by separate electronic hardware and software components.

The modules and data stores may be embodied by electronic hardware and software components including, but not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

In some implementations, the translation system 300 and search system 350 may be systems of one or more computing devices (e.g., a computer search system) that are configured to implement the techniques described herein. Put another way, the features attributed to the modules and data stores described herein may be implemented by one or more computing devices. Each of the one or more computing devices may include any combination of electronic hardware, software, and/or firmware described above. For example, each of the one or more computing devices may include any combination of processing units, memory components, I/O components, and interconnect components described above. The one or more computing devices of the translation system 300 and the search system 350 may also include various human interface devices, including, but not limited to, display screens, keyboards, pointing devices (e.g., a mouse), touchscreens, speakers, and microphones. The computing devices may also be configured to communicate with additional devices, such as external memory (e.g., external HDDs).

The one or more computing devices of the translation system 300 and the search system 350 may be configured to communicate with the network 120. The one or more computing devices of the translation system 300 and the search system 350 may also be configured to communicate with one another (e.g., via a computer network). In some examples, the one or more computing devices of the translation system 300 and the search system 350 may include one or more server computing devices configured to communicate with user devices (e.g., receive query wrappers and transmit search results), gather data from data sources 130, index data, store the data, and store other documents. The one or more computing devices may reside within a single machine at a single geographic location in some examples. In other examples, the one or more computing devices may reside within multiple machines at a single geographic location. In still other examples, the one or more computing devices of the translation system 300 and the search system 350 may be distributed across a number of geographic locations.

Figure 10:
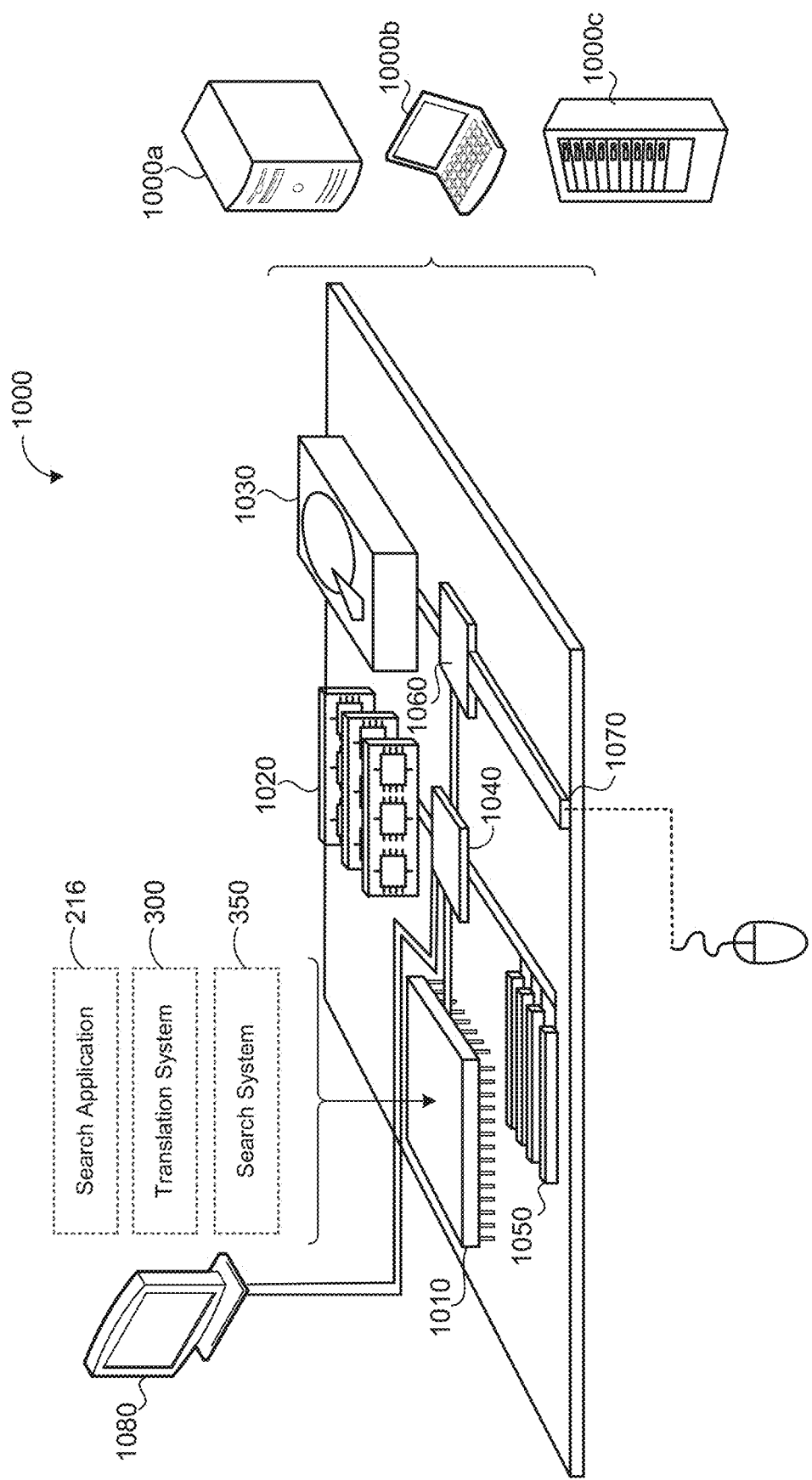
FIG. 10 is a schematic view of an example computing device executing any systems or methods described herein.

FIG. 10 is schematic view of an example computing device 1000 that may be used to implement the systems and methods described in this document. The computing device 1000 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 1000 includes a processor 1010, memory 1020, a storage device 1030, a high-speed interface/controller 1040 connecting to the memory 1020 and high-speed expansion ports 1050, and a low speed interface/controller 1060 connecting to low speed bus 1070 and storage device 1030. Each of the components 1010, 1020, 1030, 1040, 1050, and 1060, are interconnected using various busses, and may be mounted on a common motherboard or in other manners as appropriate. The processor 1010 can process instructions for execution within the computing device 1000, including instructions stored in the memory 1020 or on the storage device 1030 to display graphical information for a graphical user interface (GUI) on an external input/output device, such as display 1080 coupled to high speed interface 1040. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1020 stores information non-transitorily within the computing device 1000. The memory 1020 may be a computer-readable medium, a volatile memory unit(s), or non-volatile memory unit(s). The non-transitory memory 1020 may be physical devices used to store programs (e.g., sequences of instructions) or data (e.g., program state information) on a temporary or permanent basis for use by the computing device 1000. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 1030 is capable of providing mass storage for the computing device 1000. In some implementations, the storage device 1030 is a computer-readable medium. In various different implementations, the storage device 1030 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 1020, the storage device 1030, or memory on processor 1010.

The high speed controller 1040 manages bandwidth-intensive operations for the computing device 1000, while the low speed controller 1060 manages lower bandwidth-intensive operations. Such allocation of duties is exemplary only. In some implementations, the high-speed controller 1040 is coupled to the memory 1020, the display 1080 (e.g., through a graphics processor or accelerator), and to the high-speed expansion ports 1050, which may accept various expansion cards (not shown). In some implementations, the low-speed controller 1060 is coupled to the storage device 1030 and low-speed expansion port 1070. The low-speed expansion port 1070, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The computing device 1000 may be implemented in a number of different forms, as shown in the figure. For example, it may be implemented as a standard server 1000a or multiple times in a group of such servers 1000a, as a laptop computer 1000b, or as part of a rack server system 1000c.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method for improving an access to application functionality for a user device in a server, the method comprising:

receiving, by one or more processors of the server, from the user device, a translation request including an application-independent function and one or more parameters associated with the application-independent function, wherein the application-independent function is a function from which an application to perform the application-independent function is not designated;

identifying, by the one or more processors, a translation record which includes translation information matching to the application-independent function of the translation request from a plurality of translation records, wherein the translation record includes access mechanism templates and template rules for generating completed access mechanisms based on the access mechanism templates;

identifying, by the one or more processors, the completed access mechanisms based on the one or more parameters, the access mechanism templates, and the template rules, wherein the completed access mechanisms reference at least one of the application installed on the user device, or a distribution location for downloading the application, and the completed access mechanisms indicate at least one operation of the application to be performed to access at least one state of the application and associated with the translation request; and transmitting, by the one or more processors, the completed access mechanisms to the user device to display at least one user selectable link based on the completed access mechanisms, such that in response to a selection of the at least one user selectable link in the user device, the user device displays an execution screen corresponding to the at least one state associated with the translation request, by initiating an application associated with the at least one user selectable link and performing, after initiation of the application, the at least one operation including a plurality of operations to be performed to access the at least one state, the plurality of operations contained in a completed access mechanism of the completed access mechanisms.

2. The method of claim 1, wherein the translation request further comprises data associated with the user device, wherein the data indicates a platform of the user device and corresponds to fields of an access mechanism template.

3. The method of claim 2, wherein the identifying of the completed access mechanisms further comprises selecting an access mechanism template capable of accepting the one or more parameters and the data associated with the user device.

4. The method of claim 3, wherein the translation request further comprises additional data including at least one of a geo-location, a list of applications installed on the user device, or one or more entity names, and wherein selecting the access mechanism template further comprises selecting an access mechanism template associated with the additional data.

5. The method of claim 2, wherein the translation request further comprises a search query.

6. The method of claim 5, wherein the translation record includes the translation information matched to terms of the search query.

7. The method of claim 5, wherein the identifying of the completed access mechanisms further includes ranking the completed access mechanisms.

8. The method of claim 7, wherein the ranking of the completed access mechanisms comprises:
identifying, by the one or more processors, at least one relevance score each for the completed access mechanisms respectively, wherein each of the at least one relevance score indicates relative relevance of each of the completed access mechanisms to the search query; and
ranking, by the one or more processors, one or more of the completed access mechanisms based on the at least one relevance score.

9. The method of claim 7, wherein the ranking of the completed access mechanisms comprises:
identifying, by the one or more processors, at least one popularity score each for the completed access mechanisms respectively, wherein each of the at least one popularity score indicates relative popularity of each of at least one application state each corresponding to the completed access mechanisms respectively; and
ranking, by the one or more processors, one or more of the completed access mechanisms based on the at least one popularity score.

10. A server configured to improve access to application functionality for a user device, the server comprising:
one or more storage devices; and
one or more processors that execute computer-readable instructions, the computer-readable instructions, when executed by the one or more processors, cause the one or more processors to:
receive, from the user device, a translation request including an application-independent function and one or more parameters associated with the application-independent function, wherein the application-independent function is a function from which an application to perform the application-independent function is not designated,
identify a translation record which includes translation information matching to the application-independent function of the translation request from a plurality of translation records stored in the one or more storage devices using the translation request, wherein the translation record includes access mechanism templates and template rules for generating completed access mechanisms based on the access mechanism templates,
identify the completed access mechanisms based on the one or more parameters, the access mechanism templates, and the template rules, wherein the completed access mechanisms reference at least one of the application installed on the user device or a distribution location for downloading the application, and the completed access mechanisms indicate at least one operation of the application to be performed to access at least one state of the application and associated with the translation request, and
transmit the completed access mechanisms to the user device to display at least one user selectable link based on the completed access mechanism,
such that in response to a selection of the at least one user selectable link in the user device, the user device displays an execution screen corresponding to the at least one state associated with the translation request, by initiating an application associated with the at least one user selectable link and performing, after initiation of the application, the at least one operation including a plurality of operations to be performed to access the at least one state, the plurality of operations contained in a completed access mechanism of the completed access mechanisms.

11. The server of claim 10, wherein the translation request further comprises data associated with the user device, wherein the data indicates a platform of the user device and corresponds to fields of an access mechanism template.

12. The server of claim 11, wherein the one or more processors identify the completed access mechanisms by selecting an access mechanism template capable of accepting the one or more parameters and the data associated with the user device.

13. The server of claim 12, wherein the translation request further comprises additional data including at least one of a geo-location, a list of applications installed on the user device, or one or more entity names, and wherein the one or more processors select the access mechanism template with which to identify the completed access mechanisms by selecting an access mechanism template associated with the additional data.

14. The server of claim 11, wherein the translation request further comprises a search query.

15. The server of claim 14, wherein the translation record includes the translation information matched to terms of the search query.

16. The server of claim 14, wherein the one or more processors rank the completed access mechanisms, and wherein the ranking of the completed access mechanisms comprises:
identifying, by the one or more processors, at least one relevance score each for the completed access mechanisms respectively, wherein each of the at least one relevance score indicates relative relevance of each of the completed access mechanisms to the search query; and
ranking, by the one or more processors, one or more of the completed access mechanisms based on the at least one relevance score.

17. The server of claim 16, wherein the ranking of the completed access mechanisms comprises:
identifying, by the one or more processors, at least one popularity score each for the completed access mechanisms respectively, wherein each of the at least one popularity score indicates relative popularity of each of at least one application state each corresponding to the completed access mechanisms respectively; and
ranking, by the one or more processors, one or more of the completed access mechanisms based on the at least one popularity score.

18. A user device comprising:
a display; and
one or more processors that execute computer-readable instructions, the computer-readable instructions, when executed by the one or more processors, cause the one or more processors to:
  transmit, to a server, a translation request including an application-independent function and one or more parameters associated with the application-independent function, wherein the application-independent function is a function from which an application to perform the application-independent function is not designated,
  receive, from the server, completed access mechanisms identified based on the application-independent function and the one or more parameters, wherein the completed access mechanisms reference at least one of the application installed on the user device or a distribution location for downloading the application, and the completed access mechanisms indicate at least one operation of the application to be performed to access at least one state of the application associated with the translation request,
  control the display to display at least one user selectable link based on the completed access mechanisms, and
  based on a selection on one user selectable link, control the display of an execution screen corresponding to the at least one state associated with the translation request, by initiating an application associated with the selected user selectable link and performing, after initiation of the application, at least one operation including a plurality of operations to be performed to access the at least one state, the plurality of operations contained in a completed access mechanism of the completed access mechanisms.

19. The user device of claim 18,
wherein the one or more processors are further configured to transmit the one or more parameters with the application-independent function or transmit the one or more parameters after transmitting the application-independent function, and
wherein the completed access mechanisms are identified based on the application-independent function and the one or more parameters.

20. The user device of claim 19, further comprising an input device,
wherein the one or more processors are further configured to receive the one or more parameters based on a user input received through the input device.

21. The user device of claim 18, the at least one state comprises a state of the application providing a user interface for performing a function associated with the application-independent function.

* * * * *